(12) United States Patent
Werthen et al.

(10) Patent No.: US 8,180,225 B2
(45) Date of Patent: May 15, 2012

(54) OPTICAL DATA LINK

(76) Inventors: Jan-Gustav Werthen, Cresskill, NJ (US); Ta-Chung Wu, San Jose, CA (US)

( * ) Notice: Subject to any disclaimer, the term of this patent is extended or adjusted under 35 U.S.C. 154(b) by 1157 days.

(21) Appl. No.: 11/958,460

(22) Filed: Dec. 18, 2007

(65) Prior Publication Data

US 2008/0235418 A1    Sep. 25, 2008

Related U.S. Application Data

(60) Provisional application No. 60/871,101, filed on Dec. 20, 2006.

(51) Int. Cl.
*H04B 10/00* (2006.01)
*H04B 10/24* (2006.01)

(52) U.S. Cl. ............ 398/171; 398/41; 398/135; 398/138

(58) Field of Classification Search .................. 398/171, 398/41, 135, 138
See application file for complete search history.

(56) References Cited

U.S. PATENT DOCUMENTS

| | | | |
|---|---|---|---|
| 5,342,451 A | 8/1994 | Virshup | 136/244 |
| 6,950,610 B2 * | 9/2005 | Lee | 398/141 |
| 7,359,647 B1 * | 4/2008 | Faria et al. | 398/171 |
| 2002/0044746 A1 * | 4/2002 | Kronlund et al. | 385/53 |
| 2005/0226625 A1 * | 10/2005 | Wake et al. | 398/115 |

FOREIGN PATENT DOCUMENTS

| | | |
|---|---|---|
| DE | 4433441 C1 | 2/1996 |
| DE | 10257948 A1 | 7/2004 |

* cited by examiner

*Primary Examiner* — Kenneth N Vanderpuye
*Assistant Examiner* — Daniel Dobson
(74) *Attorney, Agent, or Firm* — Matthew A. Pequignot; Pequignot + Myers LLC

(57) ABSTRACT

The invention provides an optically powered device interface module for operating an external device, and an optically powered data link comprising the same. In one embodiment the device interface module includes an optical interface for receiving optical power and data signals, an electrical USB interface for providing USB compliant electrical data signals and a 5V electrical power signal to an external USB device, a transducer coupled to a signal processor for converting the optical power and data signals into the 5V electrical power signal and the USB-compliant electrical data signals, and a power distribution circuit for providing electrical power obtained from the optical power signal to the device interface module circuitry. The transducer may be embodied using a single photovoltaic power converter for receiving the optical power and for receiving and transmitting optical data signals.

19 Claims, 20 Drawing Sheets

OPTICAL DATA LINK

CROSS-REFERENCE TO RELATED APPLICATIONS

The present invention claims priority from U.S. Provisional Patent Application No. 60/871,101 filed Dec. 20, 2006, entitled "Optically Powered USB Link", which is incorporated herein by reference.

TECHNICAL FIELD

The present invention generally relates to computer systems and devices using the Universal Serial Bus (USB) protocol for communications, and in particular relates to an optical USB link wherein both data and power are transmitted optically.

BACKGROUND OF THE INVENTION

The recent proliferation of computer-controlled devices for performing a wide variety of tasks can be at least partially attributed to the development of powerful and convenient communications interface standards, such as various types of serial bus interfaces. Some of them have conveniently incorporated remote electrical powering to the communication functionality of the interface, so that peripheral devices that do not require excessive electrical power to operate could be powered remotely through the communications interface rather than requiring a built-in or a separate power supply at the device location. One such interface standard that has now become ubiquitous is the Universal Serial Bus (USB).

The USB is a peripheral hub-centric serial bus that is widely used to facilitate coupling of a wide range of simultaneously accessible peripheral devices to a host computer system. The bus allows up to 127 peripheral devices to be attached, configured, used, and detached while the host is in operation. For example, USB printers, scanners, digital cameras, storage devices, card readers, etc. may communicate with a host computer system over USB. USB based systems may require that a USB host controller be present in the host system, and that the operating system (OS) of the host system support USB and USB Mass Storage Class Devices. As compared to other ways of connecting devices to the computer, such as parallel ports, serial ports and custom cards installed inside the computer's case, the USB devices are relatively simple. If the USB device is a new device, the OS auto-detects the USB device and may initiate a dialog with the user to locate a driver for the USB device. If the USB device has already been installed, the computer activates the USB device.

USB devices may communicate with the USB host at low-speed (LS), full-speed (FS), or high-speed (HS). USB Specification version 1.1 supports two different rates for transmitting data: A Low Speed (LS) rate of 1.5 Mega bits (Mbits) per second that is mostly used for low-speed human interface type devices such as keyboards and mice, and a Full-Speed (FS) rate of 12 Mbits/second for most other devices. USB Specification 2.0 adds a High-Speed (HS) rate of 480 Mbps for communications with high speed devices. The USB Specification Revision 2.0, Apr. 27, 2000, which describes the USB 2.0 protocol in detail, is available on-line at http://www.usb.org/developers/docs and is incorporated herein by reference in its entirety.

A connection between the USB device and the USB host is typically established via a four wire interface that is formed by 4-pin USB connectors and a USB cable that includes four wires: two wires for providing a 5V dc power signal and ground, respectively, and a twisted pair of wires to carry data, which are labeled as D+ and D−, and are used for half-duplex differential signaling to combat the effects of electromagnetic noise on longer lines, with the data sent in digital format using a NRZI (Non Return to Zero Invert) encoding scheme.

Advantageously, low-power devices such as mice, video cameras, and/or other devices can draw their power directly from the USB connection. High-power devices such as printers and/or other devices have power supplies and typically draw minimal power from the USB connection. USB devices are hot-swappable, which means that they can be plugged and unplugged at any time. Up to 127 devices can be connected to any one USB bus at any one given time. At system turn-on, the host computer powers up, queries all of the USB devices connected to the bus and assigns an address to each USB device. This process is called enumeration; USB devices are also enumerated when they are connected to the bus in operation. The host computer determines the type of data transfer that the USB device employs, such as an interrupt mode, a bulk transfer mode, or an isochronous mode.

Due to it numerous advantages and ease of operation, the USB protocol is now the prevalent protocol for communication between computers and peripheral devices of different kind. Various sensors, transducers as well as more recently GPS devices and video cameras are now available with a USB interface that provides both power and the entire data transmission between the device and a computer in a digital format. This universality leads to acceptance of the USB protocol as a standard protocol for peripheral communications, as well as the proliferation of digital data transmission for a variety of applications.

However, the traditional USB links involving communications over 4-wire USB cables cannot be longer than 5 meters, therefore limiting possible applications to a desktop type environment. This is in part due to strict limitations that the current USB specification imposes on the cable delay time, which should not exceed 26 ns for a single cable. There is however another important limitation on the maximum length of a traditional USB cable, namely—signal attenuation, which in traditional 4-wire USB cables strongly increases with signal frequency, typically from about 0.7 dB/m at 10 MHz to as high as 5.8 dB/m at 400 MHz. This signal attenuation makes it difficult to impossible to use cables in excess of 5-10 meters at full and, especially, high data transfer speed.

Another limitation of the traditional USB copper-based links is their potential susceptibility to high magnetic, voltage and RF fields, which may induce errors in USB data transmission. Furthermore, the traditional copper-based USB cables can themselves be a source of electromagnetic interference (EMI), and therefore their use can cause undesirable problems in EMI-sensitive environments.

U.S. Pat. No. 6,950,610 issued to Lee and assigned to Opticis Co., LTD, which is incorporated herein by reference, has disclosed an optical communication interface module for connecting USB interfaces through an optical fiber line that employs separate optical fibers to transmit optical signals in each direction. However, the optical communication interface module of Lee only partially solves the above stated problems, since operating a USB device using it will either still require two separate copper lines VCC and GND to remotely power the device, or require an external power supply at the device location, which may be inconvenient or even close to impossible in some applications. The optical communication interface modules of Lee therefore do not provide a fully-functional all-optical alternative to a USB cable, which would be beneficial in applications where conventional copper USB cables cannot be used, such as in EMI sensitive environments.

It is therefore desirable to provide a USB link and USB interface modules that can be used in EMI sensitive environments or in the presence of high magnetic, electrical and RF fields to remotely operate and to power conventional USB devices.

An object of the present invention is to overcome the shortcomings of the prior art by providing an optically powered optical data link and optical interface modules for remotely powering and operating peripheral devices using a desired communications protocol, and to provide an optically powered optical data link and optical interface modules that are capable of operating in EMI sensitive environment or in the presence of strong electrical, magnetic or RF fields.

SUMMARY OF THE INVENTION

In accordance with the invention, a device interface module is provided for remotely powering and operating an external device, the device interface module comprising: an optical interface for receiving an upstream optical signal from an optical fiber line and for transmitting a downstream optical signal through the optical fiber line; an electrical interface for connecting to the external device, comprising a data port for receiving an input electrical data signal from the external device according to a pre-determined data communications protocol and for providing an output electrical data signal to the device, and an output power port for providing electrical power to the remote device; a transducer optically coupled to the optical interface for converting the upstream optical signal into a received electrical data signal and electrical power, and for generating the downstream optical data signal; a signal processor comprising a receiver circuit operatively connected between the transducer and the electrical data port for producing the output electrical data signal from the received electrical data signal according to the pre-determined data communications protocol, and a transmitter circuit operatively connected between the electrical data port and the transducer, for producing an electrical drive signal from the input electrical data signal for driving the transducer therewith to generate the downstream optical data signal; and, a power distribution circuit for distributing the electrical power obtained from the upstream optical signal for powering the external device, the signal processor and the transducer.

The transducer preferably comprises a multi-segment photovoltaic power converter (MSPPC) that is optically coupled to the optical interface for receiving the upstream optical signal and may further comprise a signal separation circuit for separating power and data components of the detected electrical signal. In one embodiment, the transducer further comprises a bias circuit for forward biasing at least a segment of the MSPPC for generating the downstream optical signal, and may comprise a switching circuit for switching the at least a segment of the MSPPC between a photodetecting mode of operation and a light emitting mode of operation. The device interface module of this embodiment may further comprise a controller for controlling the switching circuit, wherein the controller is operatively connected for monitoring at least one of the received electrical data signal and the output electrical data signal so as to switch the at least a segment of the MSPPC from the photodetecting mode of operation to the light emitting mode of operation upon detecting an end of the upstream transmission, and for monitoring at least one of the electrical drive signal and the input electrical data signal so as to switch the at least a segment of the MSPPC from the light emitting mode of operation to the photodetecting mode of operation upon detecting an end of the downstream transmission. This embodiment of the invention utilizes the MSPPC to generate electrical power from the upstream optical signal for powering the external device and internal circuitry of the device interface module, to receive an upstream optical data signal, and to transmit the downstream optical data signal.

In accordance with another aspect of this invention there is provided an optically powered optical data link comprising the device interface module, a host interface module, and the optical fiber line optically connecting the host interface module to the device interface module. The host interface module comprises an electrical interface electrically coupled to a host controller, and an optical transceiver optically coupled to the optical fiber line, the optical transceiver configured for converting an upstream electrical data signal provided from the host controller into the upstream optical signal, and for converting the downstream optical data signals received from the device interface module into upstream electrical data signals for providing to the host controller.

BRIEF DESCRIPTION OF THE DRAWINGS

The invention will be described in greater detail with reference to the accompanying drawings which represent preferred embodiments thereof and in which like reference labels are used to indicate like elements, wherein.

DETAILED DESCRIPTION

Figure 1:
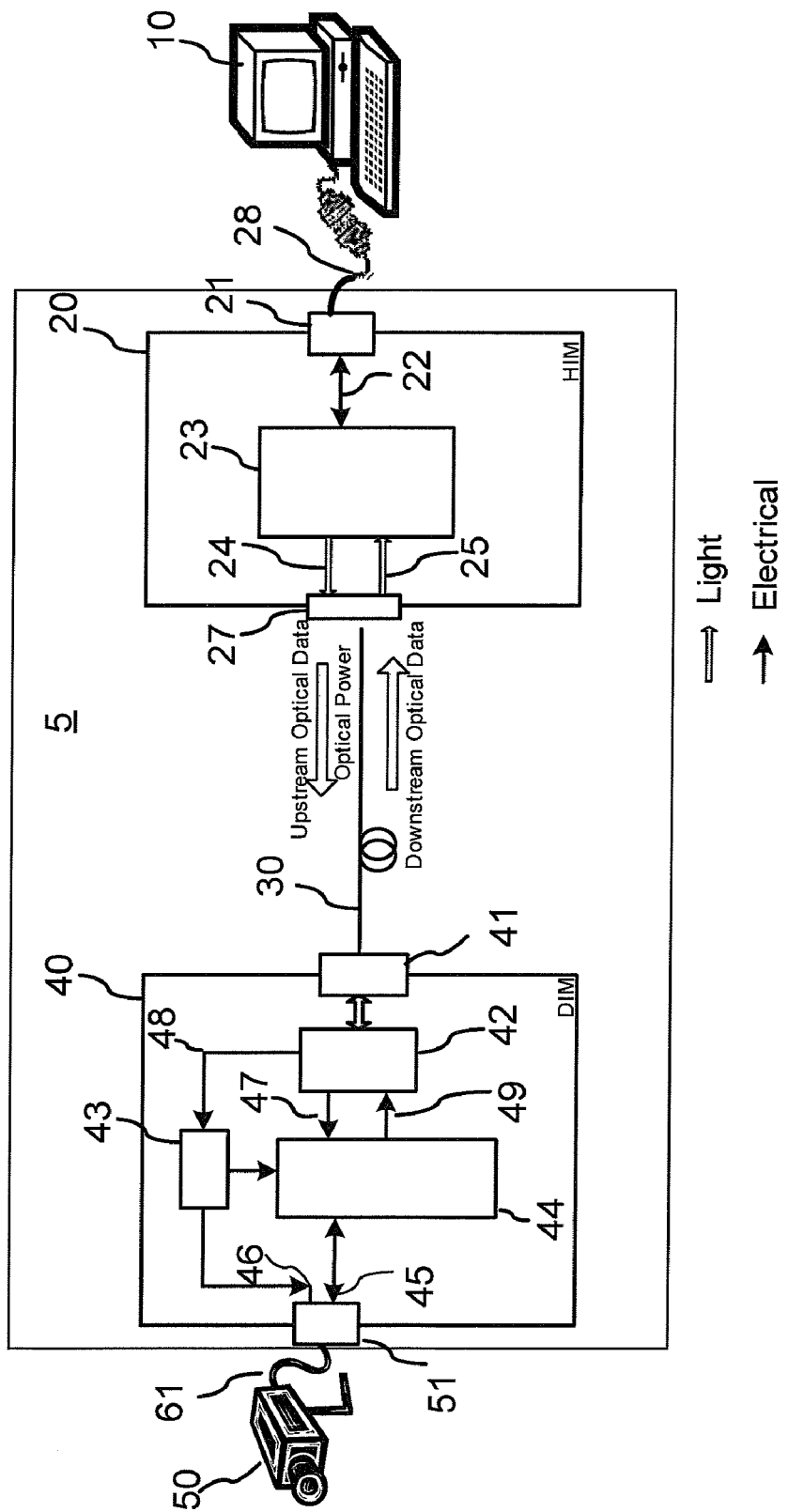
FIG. 1 is a diagram of an optical data link according to the present invention.

FIG. 1 illustrates an optical data link (ODL) 5 between a host controller 10 and an external, or peripheral device 50 according to the present invention. The host controller 10, which can be embodied for example as a card in a computer, and the device 10 preferably support one of standard communication protocols and preferably have standard communication interfaces. The ODL 5 may be used for operating the peripheral device 50, hereinafter referred to as simply the device 50, by providing a communication channel between the device 50 and the host controller 10, and by remotely supplying the device with electrical power required for it operation. By way of example, the device 50 is shown as a video camera and has a USB port. In other embodiment, the device 50 can be any other device that has a desired functionality, can be externally powered, and has a standard communication interface supporting one or more standard data communication protocols, including but not limited to interfaces which comply with serial bus interface standards such as USB, FireWire, $I^2C$, and RS 232, and video interfaces such as DMV and HDMI. A data communications protocol as used in the current specification is a set of standard rules for representing data with digital electrical signals, which may include rules for representing actual data to be transmitted and signaling rules for supporting the communication between the host and the device, such as signaling a beginning and end of a transmission session, of a packet or a frame.

In the shown embodiment, the host controller 10 is a USB host controller, and the device 50 has a standard USB 1.1 or USB 2.0 interface including a 4-pin USB cable 61 having a VCC line for supplying a 5V power to the device, a ground line GND, and a pair of twisted signaling lines D+ and D− for supporting bi-directional data communications with the host controller 10 using differential signaling according to the USB protocol.

The ODL 5 is comprised of a host interface module (HIM) 20 and a device interface module (DIM) 40, which are coupled by an optical line 30 embodied as a fiber-optic cable. Depending on a particular embodiment, the fiber-optic cable 30 may have one, two or three optical fibers as described hereinbelow. Data transmission from the host 10 to the device 50 is referred to hereinafter as the upstream transmission, while data transmission from the device 50 to the host 10 is referred to hereinafter as the downstream transmission.

The device interface module 40 includes an optical interface 41 to which a distal end of the fiber-optic cable 30 is coupled, and an electrical interface 51 to which the device 50 is operatively connected by means of the cable 61. The electrical interface 45, which preferably matches the communication interface of the device 50, includes an output power port and a bidirectional data port. In the exemplary embodiments herein described, the electrical interface 51 may be a standard USB connector having a ground pin GND, a power supply pin VCC for outputting a 5V power signal, and signaling pins D+ and D− for supporting data communications according to the USB protocol. The optical and electrical interfaces 41, 51 are operatively coupled by means of a transceiver circuit 42, 43, 44, which converts optical signal or signals received from the optical line 30 into electrical power and data signals for providing to the device 50, and converts electrical data signals from the device 50 into optical data signals for sending over the data line 30. A transducer 42 is optically coupled to the optical interface 41, and electrically connects to a signal processor circuit 44, which in turn connects to the electrical interface 51 via a bidirectional electrical connection 45. A power distribution circuit 43 has an input that is electrically coupled to a power output port of the transducer 42, and one or more outputs that are electrically coupled to the power output port 46 of the electrical interface 51, and also to the signal processor 44 for supplying electrical power thereto.

The host interface module 20 has an optical interface 27 optically coupled to a proximal end of optical line 30, and an electrical interface 21, which may include a USB connector, that is connected to a matching electrical communications interface 28 of the host controller 10, for example the USB interface. The optical and electrical interfaces 27, 21 of the HIM 20 are operatively coupled by an optical transceiver 23.

In operation, the electrical interface 21 of the host interface device receives the upstream electrical data signal $S_{up}$ generated by the host controller 10, and provides them to the optical transceiver 23, which converts it into an upstream optical signal $P_{up}$ 24 that includes a sequence of optical pulses representing the upstream electrical signal $S_{up}$, and transmits said upstream optical signal through the optical interface 27 and the optical line 30 to the DIM 40.

The optical interface 41 of the DIM 40 receives the upstream optical signal $P_{up}$, and provides it to the transducer 42, which converts the upstream optical signal into a received electrical data signal $S_{rd}$ 47 and an electrical power signal $S_p$ 48. In a preferred embodiment, the transducer 42 includes a photovoltaic power converter PPC (not shown) for converting the upstream optical signal $P_{up}$ into at least the electrical power signal, and preferably also for extracting therefrom the received data signal $S_{rd}$ 47. The received electrical data signal $S_{rd}$ 47 is then provided to the signal processor 44, which includes a receiver circuit (nor shown) for producing therefrom an output electrical data signal $S_{out}$ that is compliant with the standard communication protocol supported by the device 50, in the current example—the USB protocol. The output electrical data signal $S_{out}$ is then provided to the electrical interface 51 and thereby to the device 50.

Communication signals generated by the device 50 in compliance with the selected standard communications protocol are received by the electrical (USB) interface 51 of the DIM 40 as input electrical data signals, and are provided through the bi-directional connection to a transmitter circuit (not shown) of the signal processor 44, which is operatively connected between the electrical data port 45 of the electrical interface 51 and the transducer 42. The receiver circuit produces an electrical drive signal $S_{dr}$ from the input electrical data for driving the transducer 42 therewith to generate a downstream optical data signal $P_{dwn}$, which is then transmitted by the transducer 42 through the optical interface 41 of the DIM 40 and the optical fiber line 30 to the HIM 20.

The optical interface 27 of the HIM 20 receives the upstream optical data signal $P_{up}$, and couples it into a receive port of the transceiver 23, which detects and processes the signal to re-produce the upstream electrical data signal $S_{up}$, which is then fed to the host controller via the USB interface 21.

Advantageously, the ODL 5 of the present invention enables operating the device 50 without any additional source of electrical power at the distal end of the link; electrical power required for operation of both the DIM 40 and the device 50 is remotely supplied from the HIM 20 via the fiber line 30 in the form of optical power, which is then converted by the transducer 42 into electrical power and used for powering both the internal circuitry of the DIM 40, and the device 50, so that neither of them requires electrical power supplies.

The upstream optical signal $P_{up}$ may be comprised of optical data and power signals $P_{ud}$, $P_p$ that are generated separately using dedicated optical sources in the transceiver 23 at a same or different wavelengths and then delivered to the DIM 40 using either two separate optical fibers within the fiber line 30, or they can be coupled into a single fiber strand. Alternatively, it can be generated by a single optical transmitter such as a high-power laser diode that is modulated to carry the upstream data signal. The transducer 42 may include a separate photodetector for detecting the optical data signal and the PPC for converting the optical power signal into the electrical power signal, and may also include a light source such as an LED or a VCSEL for generating the downstream optical data signal. A preferred embodiment of the current invention however utilizes a single PPC to convert optical power into electrical power, and to detect the data signal component of the upstream optical signal. Furthermore, some embodiments may utilize the same PPC for transmitting the downstream optical data signal $P_{dwn}$ to the HIM 20 via the optical line 30, which in this case advantageously includes a single fiber strand both for downstream and upstream optical signals.

Figure 2:
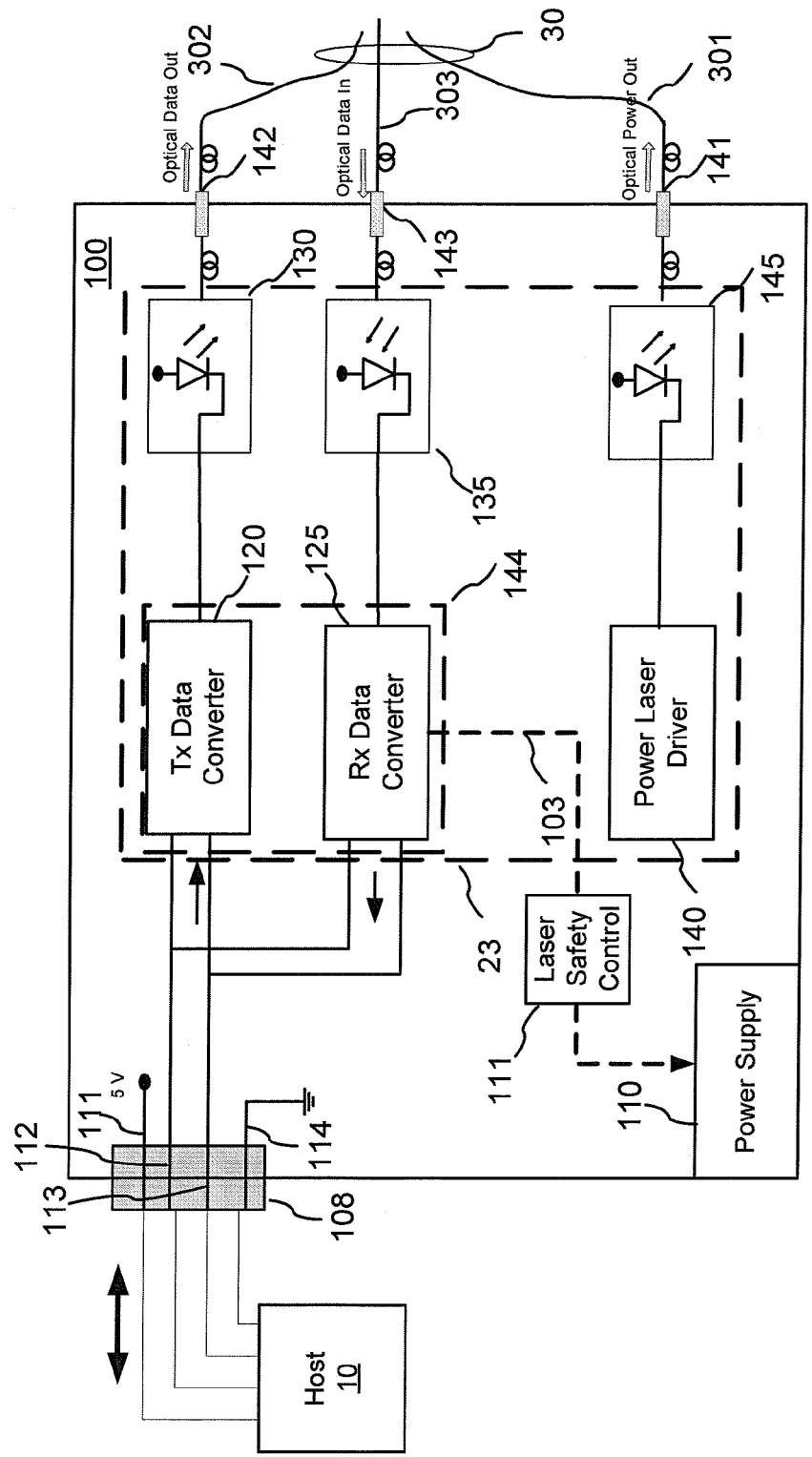
FIG. 2 is a diagram of a host interface module according to a first embodiment of the present invention.

FIG. 2 illustrates a first embodiment 100 of the HIM 20, which is referred to hereinafter as the HIM 100. In this embodiment, the HIM optical transceiver 23 includes three separate devices for receiving and transmitting light: a modulated optical source (MOS) 130 for generating a upstream optical data signal $P_{ud}$, an optical power source (OPS) 145 for generating the optical power signal $P_p$, and a photodetector (PD) 135 for receiving the downstream optical data signal $P_{dwn}$ and converting it into an electrical signal. Additionally, the HIM transceiver 23 in this embodiment also includes a power laser driver 140 and a signal processor 144, which in turn includes a transmitter (Tx) circuit 120 and a receiver (Rx) circuit 125.

The MOS 130 can utilize an LED, an edge-emitting laser diode (LD) or a VCSEL, and may include driver circuitry for drive current modulation as known in the art. The OPS 145 can be embodied as a high-power laser diode, for example a 980 nm pump laser diode, preferably having a fiber-optic pigtail. An additional power supply 110 may be used to provide enough electrical power, for example about 1 W or more, to drive the OPS 145. The MOS 130 and the OPS 145 may emit light at equal or different wavelengths, preferably but not exclusively in the wavelength range between 0.8 nm and 1.55 nm, for which relatively inexpensive compact high-power optical sources and light emitters amiable to direct current modulation are commercially available, and where optical fibers of the optical line 30 have suitably low optical loss. The PD 135 can be embodied as PIN or PN diode suitable for detecting the downstream optical data signal, and can include bias circuitry. The OPS 145, MOS 130, and PD 135 are each optically coupled, for example using fiber-optic pigtails, to respective fiber-optic connectors 141, 142 and 143, which together form the HIM optical interface 27, which in turn connect to three optical fibers 301-303 that form the optical line 30 in this embodiment of the invention; two of these fibers, 301 and 302, are used for separately transmitting the optical power signal and the optical data signal, while the optical fiber 303 is used for the downstream optical transmission. The optical fibers 301-303 can be either single-mode or multimode; some embodiments may include single mode fibers, for example fibers 303 and 302 for transmitting optical data signals, and a multimode fiber 301 for transmitting the optical power signal.

Figure 3:
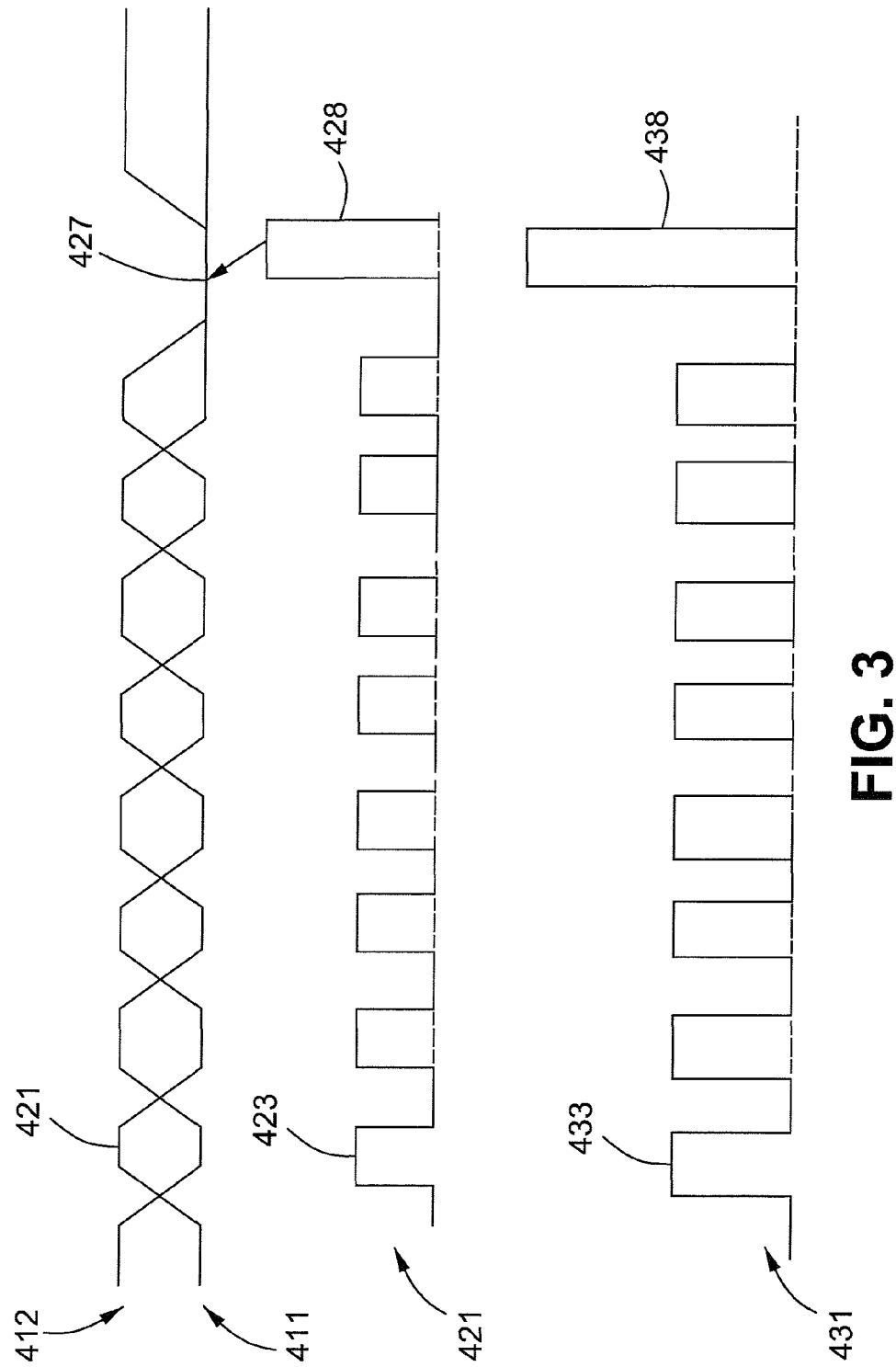
FIG. 3 is a diagram illustrating electrical and optical USB waveforms according to the present invention.

The electrical interface of the HIM 100 for connecting to the host controller 10 is embodied as a USB connector 108, having a GND ground port 114, a VCC power port 111 providing a 5V power signal, and D+ and D− data ports 112, 113 for receiving and transmitting electrical data signals D+, D−. The host controller 10 utilizes differential NRZI modulation in accordance with the USB protocol to transmit data packets. In NRZI encoding, a '1' is represented by no change in level and a '0' is represented by a change in level, so that a string of zeros causes the NRZI signal to toggle each bit time. With reference to FIG. 3, the data are transmitted using a differential voltage signal DV=(D+, D−) wherein single-ended voltage signals D+ 412 and D− 411 vary in counter-phase, so that the D− signal is in a logic "low" state when the D+ signal is in a logic "high" state, and vice versa, for every transmit data bit within a packet. Each packet concludes with an "End Of Packet" (EOP) symbol 428, typically of a two-bit duration, when both the D+ and D− signals 411, 412 are in the logical "low" state; this USB EOP signal is referred to hereinbelow as a double-zero signal.

Referring now to FIGS. 2 and 3, the Tx circuit 120 receives data packets from the electrical USB interface 108 through a differential line pair 112, 113 in the form of the differential voltage signal pair 'D+' 412 and 'D−' 411, and converts it into a single-ended pulsed current or voltage signal 421 that drives the MOS 130. This conversion is performed in such a way that each differential pulse 421 where, for example, D+ is greater than D−, is converted to a single-ended drive current pulse 423 of a first amplitude $I_1$ that is suitable for causing the MOS 130 to emit a light pulse 433, while each EOP symbol 427 is converted into a substantially larger current or voltage pulse 428 having a second amplitude $I_2$ that is substantially larger than the first amplitude $I_1$. As a result, the MOS 130 generates a series of optical pulses 431 corresponding to the differential USB signal 411, 412, so that when the differential signal DV has a first polarity, for example when D+ is greater than D−, a light pulse of a first intensity is produced, and when the differential signal DV has a second polarity opposite to the first polarity, for example when D+ is smaller than D−, substantially no light is produced, and when both the D+ and D− signals are in the logic "low" state, a light pulse of a second intensity that is substantially, for example by 50% or more, larger that the first intensity, is produced.

Figure 4:
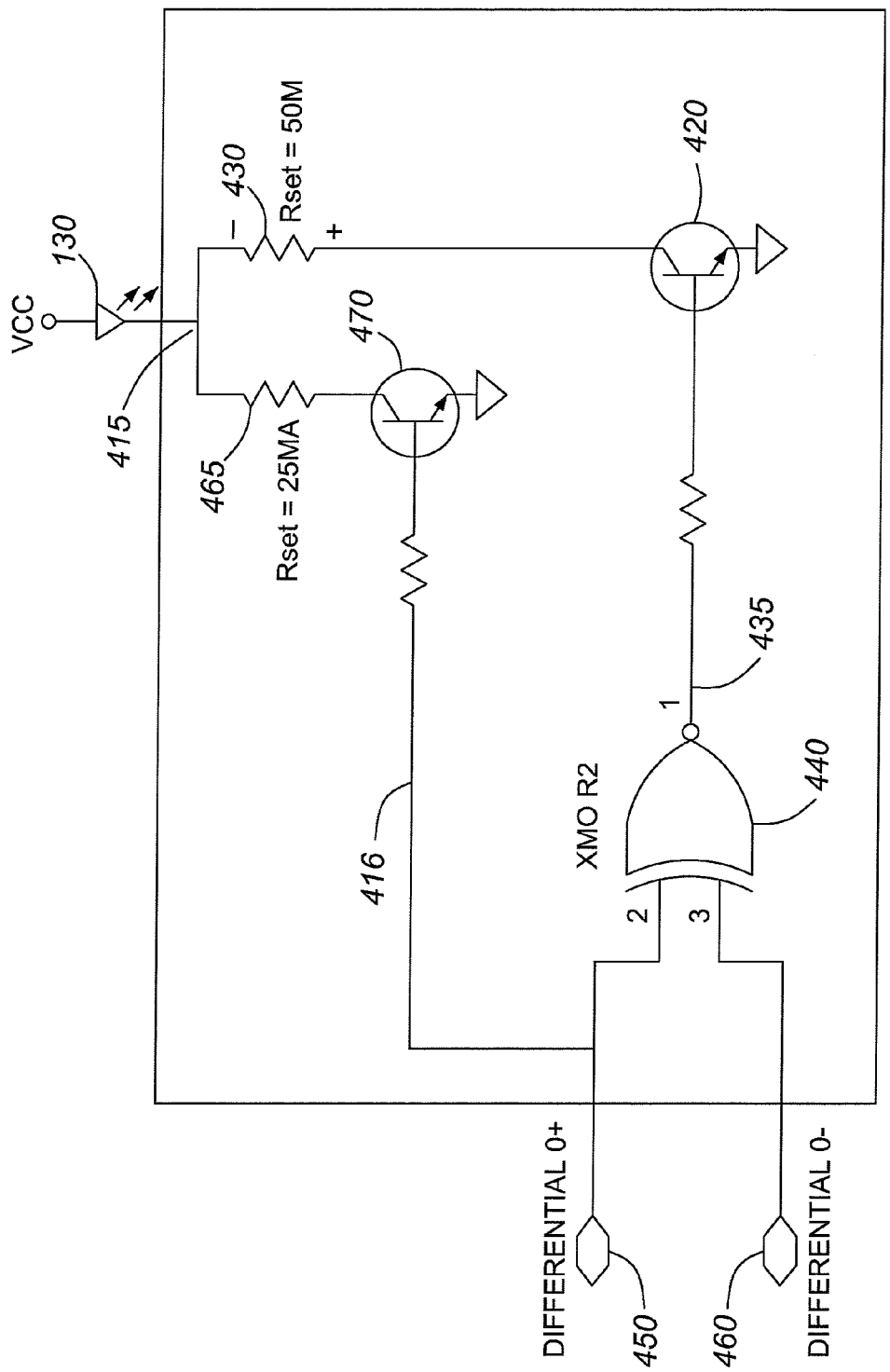
FIG. 4 is a diagram of a transmitter circuit for converting electrical USB data signals into optical data signals.

FIG. 4 illustrates one possible embodiment of the Tx circuit 120. The MOS 130 may be in the form of an LED, such as 1A299 LED from Zarlink, and is driven by transistors 470 and 420. The sum of the collector currents from these two transistors forms the electrical drive signal in the form of electrical current that is output through a port 415 and drives the LED 130. The D+ and D− signals are received via input ports 450 and 460, and are provided to input ports of an exclusive-NOR (XNOR) logic gate 440. An output signal E=XNOR{D+,D−} of the XNOR gate 440 is a logical "high", or "1" when D+=D−, and a logical low, or "0" when D+ is either greater or smaller than D−. The output port 435 of the XNOR gate 440 is connected to a base of the second transistor 420 through a base resistor 430, so that the second transistor, 420, is driven by the XNOR gate signal E=XNOR{D+,D−}. The first transistor 470 is driven directly by the D+ signal through a connection 416 and a second base resistor 465.

By way of example, collector resistors 465 and 430 are such that the first transistor 470 contributes 25 mA to the total LED current when D+ is a '1'. If the D+ signal is a '0', then no current is driven by the first transistor 470. The contribution to the total LED current from the second transistor 420 is 50 mA when D+=D−, and zero when D+NOT=D−. Accordingly, four possible states of the differential signal (D+,D−) result in four values of the total LED current flowing through the LED 130:

State 1: D+=D−='0'; LED current=50 mA (EOP signal)
State 2: D+='0', D−='1'; LED current=0 mA
State 3: D+='1', D−='0'; LED current=25 mA
State 4: D+=D−'1'; LED current=75 mA One advantage of the Tx circuit of FIG. 4 is that it provides two special optical signals, one being the EOP and a reserved second signal, to be sent optically through the same fiber channel in addition to the optical pulses corresponding to regular differential high-low USB data signals.

Referring back to FIG. 2, the optical pulses produced in this by the LED 130 are then transmitted by the MOS 130 via the optical fiber 302 as the upstream optical data signal $P_{ud}$.

The downstream optical data signal $P_{dwn}$, in the form of a sequence of optical pulses is coupled from the optical fiber 303 to the PD 135, which converts them into single-ended electrical pulse signals, which are then provided to the Rx circuit 125 that converts them into differential USB voltage signals. The Rx circuit performs an operation that is substantially a reverse of the operation performed by the Tx circuit 120, as described herein below with reference to a Rx circuit of a DIM 200 shown in FIG. 5.

The optical power signal $P_p$ generated by the OPS 145 preferably provides at least 0.5 W of electrical power, i.e. one unit load of 100 mA at 5V, at the DIM located upstream from the HIM 100. A power conversion efficiency as high as 50% can be realized using a multi-segmented PPC, such as those described in concurrent US patent applications entitled "Photovoltaic power converter" and "Multi-segment photovoltaic power converter with a center portion" filed by the applicant of the present application. Thus, the OPS 145 should emit at least 1 W of optical power, and preferably about or greater than 1.5 W of optical power, accounting for the need to power electrical and optical conversion circuitry of the upstream DIM. Such high-power laser diodes emitting up to 4 W of optical power in a multi-mode fiber at wavelengths in the 900-980 nm range are commercially available, for example, from JDSU Inc.

Since such high-power lasers can present significant safety issues, for example in case of a fiber brake, a laser safety control circuit 111 may be incorporated in the HIM 100, as illustrated in FIG. 2; this circuit shuts down laser power supply 110 when the USB "hand-shake" protocol is not established, i.e. a handshake packet is not received by the HIM 100 within a pre-determined time interval after the host controller 10 initiates communications with the external device, for example within a fraction of a second. In addition, this safety feature may be monitoring the presence of the received data signals, and in their eventual absence also command an immediate shut off of the laser driver 140 and/or laser power supply 110, so that to shut off the OPS 145. The shut-off operation can be activated by an ASCII command sent by the laser safety control circuit 111 via an RS 232 interface to the laser driver 140 and/or laser power supply 110.

Figure 5:
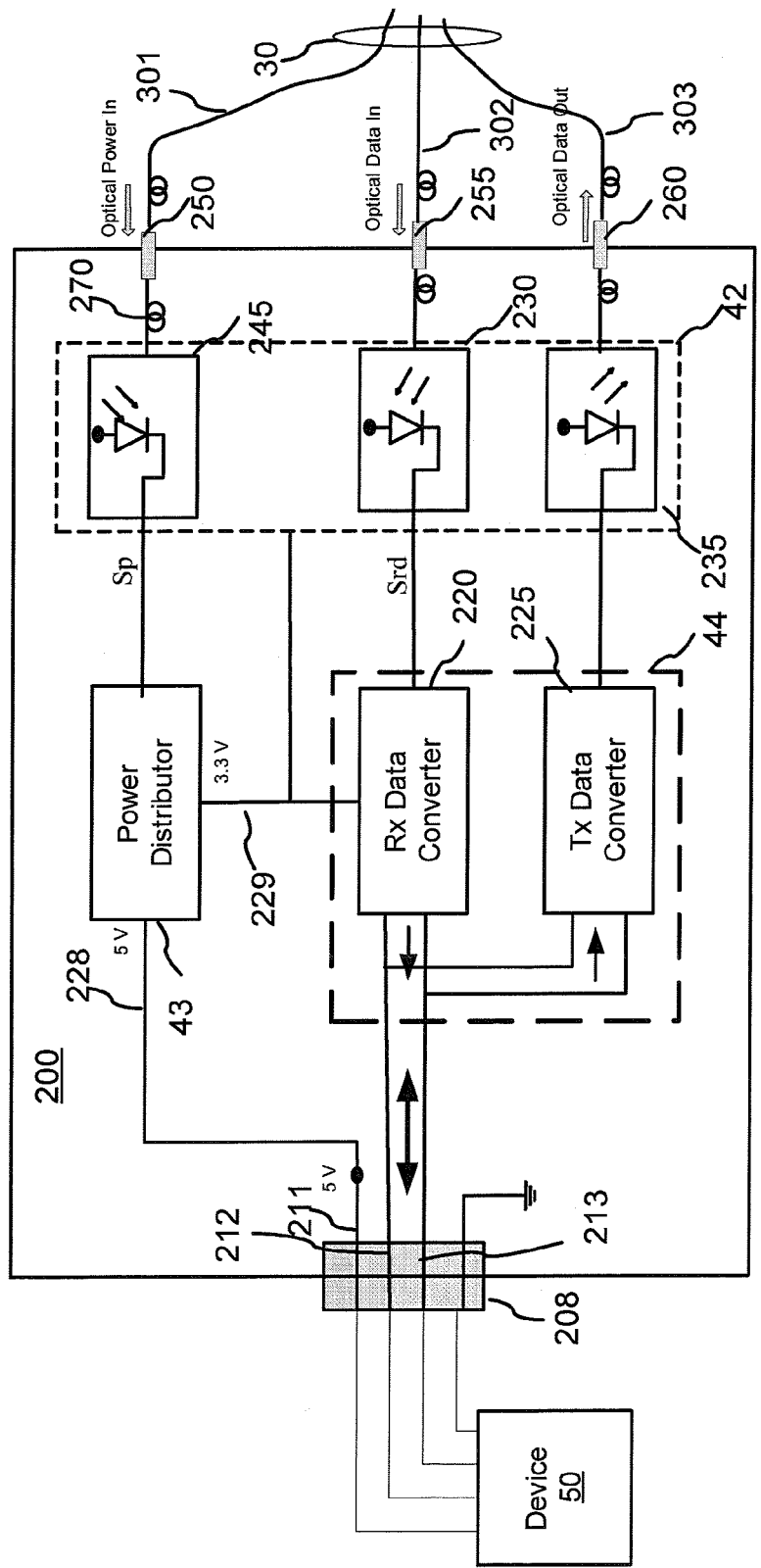
FIG. 5 is a diagram of a device interface module according to the first embodiment of the present invention.

FIG. 5 illustrates an embodiment 200 of the DIM 40, which is referred to hereinafter as the DIM 200 and is suitable for operating with the HIM 100 according to the first embodiment of the invention. In operation, the DIM 200 receives the optical power signal $P_p$ and the upstream optical data signal $P_{ud}$ from the optical fibers 301, 302 of the optical line 30. Similarly to the HIM 100, the optical interface of the DIM 200 includes fiber-optic connectors 250, 255 and 260, to which the fibers 301, 302 and 303 are coupled. The DIM transducer 42 includes in this embodiment a PD 230 that is coupled to the connector 255 for receiving the upstream optical signal $P_{ud}$, and a PPC 245 coupled to the connector 250 for receiving the optical power signal $P_p$ and converting it into an electrical power signal. The transducer 42 further includes a MOS 235, such as an LED or a VCSEL, for generating the downstream optical data signal $P_{dwn}$, in a same way as the MOS 130 of the HIM 100 is used to generate the upstream optical signal $P_{ud}$. Electrical ports of the PD 230 and the MOS 235 are connected to single-ended ports of the DIM signal processor 44, which performs same functions and have a substantially same structure as the HIM signal processor 144, with the Rx circuit 220 and the Tx circuit 225 of the DIM 200 corresponding to the Rx circuit 125 and the Tx circuit 120 of the HIM 100, and the Tx circuit 120 embodied as shown in FIG. 4.

The PPC 245 is preferably a multi-segment device such as that described in U.S. Pat. No. 5,342,451, or most preferably a multi-segment PPC such as one of the PPC devices disclosed in the co-pending U.S. patent applications entitled "Photovoltaic power converter" and "Multi-segment photovoltaic power converter with a center portion" that are assigned to the assignee of the current application, which are capable of converting the optical power signal $P_p$ into an electrical power signal $S_p$ having a voltage component of 5V or greater with power conversion efficiency in excess of 50%, so that a 100 mA, 5V power signal can be obtained from 1 W of optical power coupled into the PPC 245. This electrical power signal $S_p$ is then provided to the power distributor circuit 43 for powering the peripheral device 50 through the power port 211 of the electrical interface 208 embodied as a conventional 4-port USB connector, and for powering the signal processor 44 and the bias circuits of the transducer 42. By way of example, power distributor 43 provides a 5V power signal at the power port VCC 211 of the USB interface 208 through a 5V feed line 228 and can drive up to 100 mA of electrical current therethrough, thereby providing up to 500 mW of power to operate the external device 50, and provides up to 200 mW of electrical power though the 3.3V electrical feed 229 to the DIM 200 circuitry 44, 42, for a total electrical power of 700 mW provided by the PPC 245 by converting the optical power signal $P_p$ carrying about 1.4 W of optical power.

The upstream optical data signal $P_{ud}$ is converted by the PD 230 into a received electrical data signal $S_{rd}$, which may be in the form of a pulsed photocurrent or pulsed voltage. This received electrical data signal $S_{rd}$ is provided to the Rx circuit 220, which converts it into a differential USB-compliant output data signal $S_{out}$ that reproduces the upstream data signal $S_{up}$ which was generated by the host controller 10 and converted by the HIM 100 into the upstream optical data signal $P_{ud}$.

Figure 6:
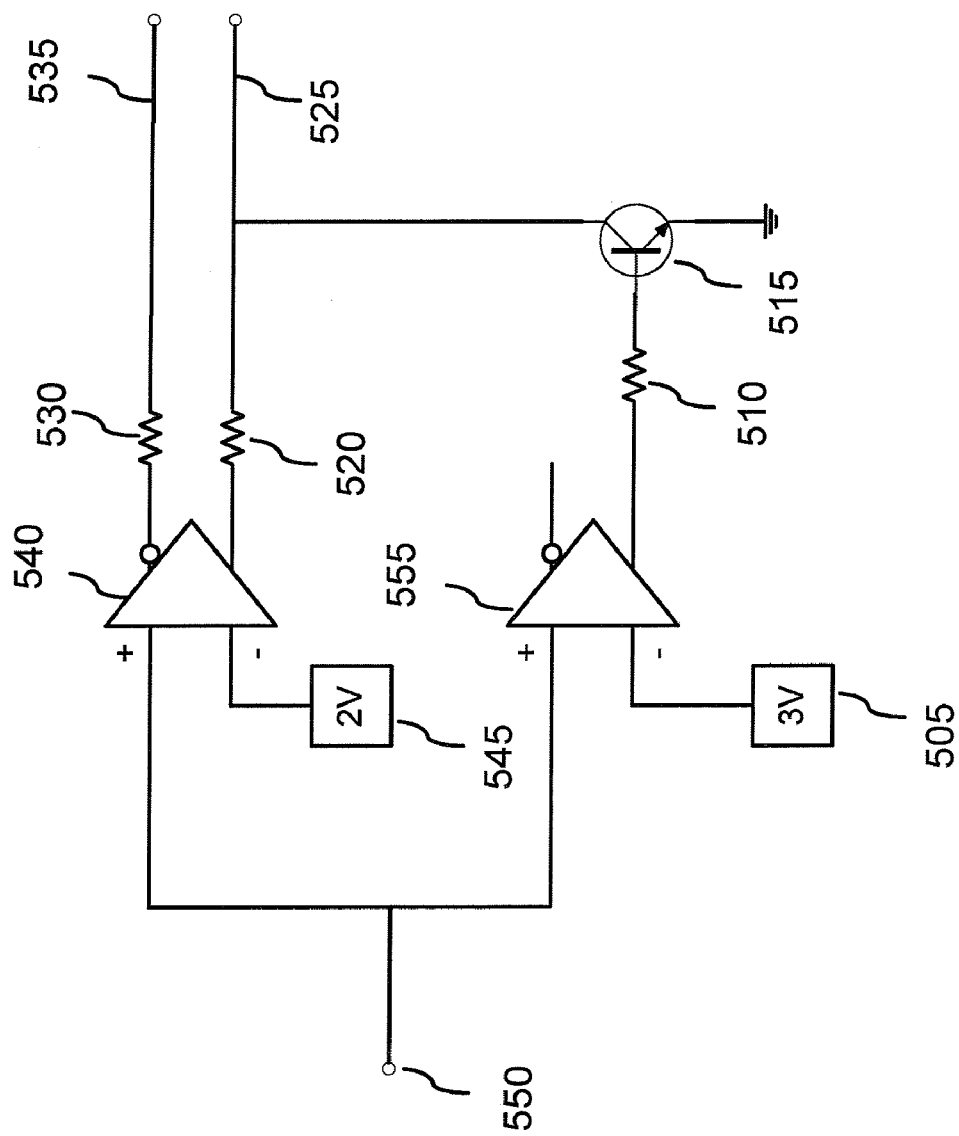
FIG. 6 is a diagram of a receiver circuit for converting the optical data signals into electrical USB signals.

One embodiment of the Rx circuit 220 is shown in FIG. 6. This embodiment of the Rx circuit 220 assumes that the PD 230 includes a current-to-voltage converter such as a transimpedance amplifier (TIA), so that the $S_{rd}$ signal is a voltage signal consisting of a sequence of voltage pulses corresponding to the optical pulses 431 of FIG. 3, with each data pulse resulting from the optical data pulses 433 having a peak voltage exceeding a first reference voltage $V_1$ but below a second reference voltage $V_2 > V_1$, and each EOP voltage pulse, i.e. voltage pulse in the received $S_{rd}$ signal corresponding to the optical EOP pulse 438, having a peak voltage exceeding $V_2$.

The Rx circuit of FIG. 6 includes an input single-ended port 550, which provides the received single-ended data signal $S_{rd}$ in the form of the voltage pulse sequence from the PD 135 to positive inputs of each of two dual voltage comparators 555 and 540, which negative inputs are connected to a source 505 of the reference voltage $V_2$ and to a source 545 of the reference voltage $V_1$, respectively. By way of example $V_1 = 2$ Volt, and $V_2$=3 Volt, so that the source 505 provides a 3V reference voltage, while the source 545 provides a 2 Volt reference voltage to the negative inputs of respective comparators 555 and 545. The 2V and 3V reference voltages are sourced from the 3.3V voltage feed of the power distributor 43, which drives a pair of dividing resistors (not shown) to each comparator minus input. The pair of dividing resistors forms a voltage divider, dividing down the 3.3V to both 2V and 3V reference values.

The Rx circuit of FIG. 6 outputs the differential data signal $S_{out}$ through a differential output port (535,525) that is comprised of a single-ended 'OUT−' port 535 and a single-ended 'OUT+' port 525.

The comparator 540, which uses termination resistors 530 and 520, serves as a data output driver: with an input signal $S_{rd}$ less than 2V, it provides a logical '1' at the 'OUT−' port 535, and a logical '0' at the 'OUT+-port 525, thereby generating a differential USB signal '0'; with an input signal $S_{rd}$ between 2V and 3V, it provides a logical '0' at the 'OUT−' port 535, and a logical '1' at the 'OUT+' port 525, thereby generating a differential USB signal '1'. When the input $S_{rd}$ signal is higher than 3V, the second comparator 555 drives the base of the transistor 515 through a resistor 510, and saturates the transistor, causing the signal at the 'OUT+' port 525 to be driven to '0', over-riding the positive output of the comparator 540.

The resulting output differential electrical data signal $S_{out}$ is in a USB protocol compliant form, and is provided to the D+ and D− ports 211, 213 of the USB interface 208 for communicating to a USB interface of the external device 50.

Downstream data packets generated by the external device 50 are received by the DIM 200 as an input electrical data signal $S_{in}$=(D+, D−) in the form of differential voltage pulses through the bi-directional D+ and D− ports 112, 113 of the electrical interface 208. This differential data signal is provided to the Tx circuit 225, which may be embodied as shown in FIG. 4 and operates as described hereinabove with reference to the Tx circuit 120 of the HIM 100, producing a single-ended drive signal $S_{dr}$ in the form of pulsed current that drives the MOS 235, resulting in the generation of the downstream optical data signal $P_{up}$.

Figure 7:
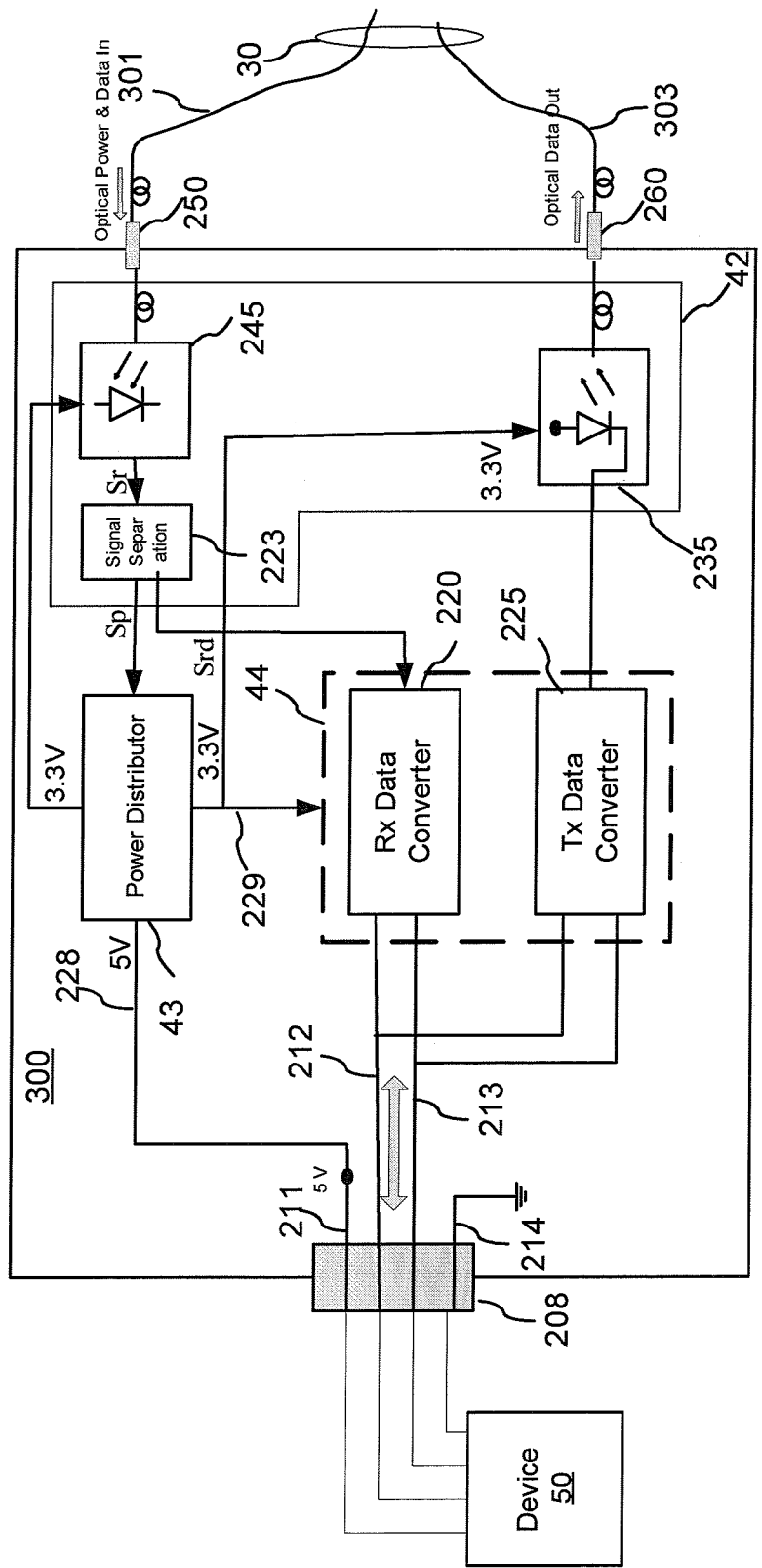
FIG. 7 is a diagram of a device interface module according to a second embodiment of the present invention.

The aforedescribed first embodiment of the invention utilizes two different optical receivers, the PD 230 and the PPC 245, to receive optical power and data signals. FIG. 7 illustrates a DIM 300 according to a second embodiment of the present invention, wherein both these functions are performed by the PPC 245. Note that FIGS. 7 and 5 use like reference numerals to refer to like features. In this second embodiment, the transducer 42 consists of two rather than three opto-electronic devices: a single light receiving device, i.e. the PPC 245, and the MOS 235, and both the upstream optical data and optical power signals $P_{ud}$, $P_p$ are delivered as a single upstream optical signal $P_{up}=P_{ud}+P_p$ using the single strand of optical fiber 301, thus enabling to eliminate one strand of optical fiber in the optical cable 30 and one photodetector compared to the DIM 200.

In operation, the PPC 245 converts the upstream optical signal $P_{up}$ into a received optical signal $S_r$, which is then passed to a signal separation circuit (SSC) 223, which separates is into the electrical power signal $S_p$ and the received electrical data signal $S_{rd}$, which may be in the form of a single-ended pulsed voltage signal. These signals are then passed to the power distribution circuit 43 and the Rx circuit 220 of the signal processor 44, respectively, which are then processed as described hereinabove with reference to FIG. 5.

Figure 8:
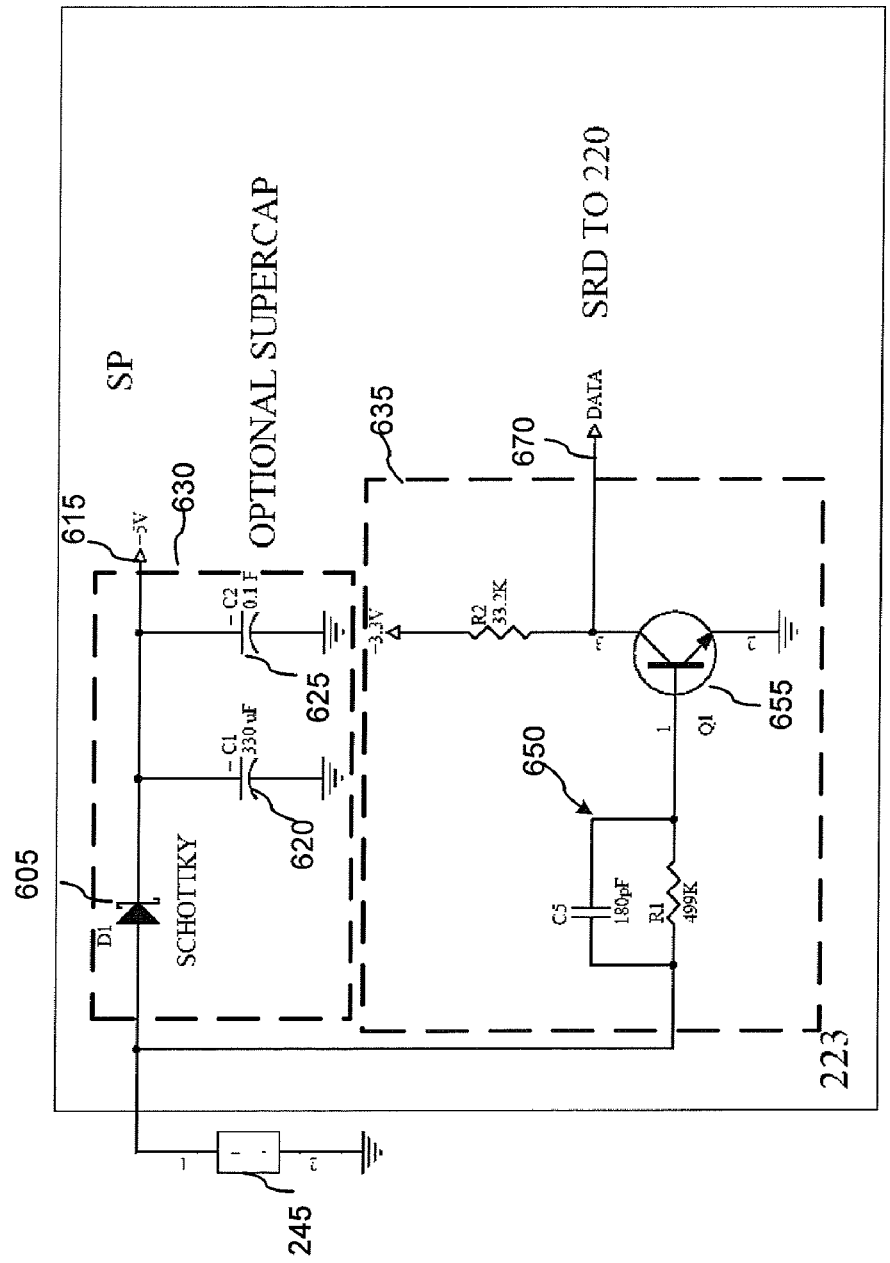
FIG. 8 is a diagram of the signal separation circuit.

With reference to FIG. 8, one embodiment of the SSC 223 includes a power extraction circuit 630 and a signal extraction circuit 635 which are both connected at their respected inputs to the anode terminal of the PPC 245. A received electrical signal $S_r$ generated at the anode terminal of the PPC 245, which has a voltage component of at least 5V or greater, is coupled into the power extraction circuit 630, which obtains therefrom the electrical power signal $S_p$ by means of a Schottky diode rectifier 605 and a shunting capacitor 620, and provides the power signal $S_p$ to the power distribution circuit 43 via a power output port 615. An optional super-capacitor 625 at the output of the power extraction circuit 630 functions as an electrical power accumulator to provide electrical power to the DIM circuitry and the external device 50 during time intervals when no electrical power is provided by the PPC 245. In a preferred embodiment, the PPC 245 generates at least 5.5V at its anode terminal from the upstream optical signal $P_{up}$.

The signal extraction circuit 635 includes a transistor 655 acting as a switch, with the collector voltage of the transistor 655 provided to the Rx circuit 220 as the received data signal $S_{rd}$ via a data output port 670. The received electrical signal $S_r$ is coupled from the anode of the PPC 245 into the base of the transistor 655 through a parallel R-C circuit 650. When the PPC 245 receives an optical pulse, an electrical current flows in the base circuit of the transistor 655, saturating said transistor and causing the collector voltage to be substantially zero, corresponding to a logic '0' to be generated at the output data port 670. In-between optical pulses when the PPC 245 receives substantially no light, the current in the base circuit of the transistor 655 is shut off, forcing the transistor 655 into a cut-off and halting the flow of current through the collector. This allows a collector resistor R2 to pull up the collector voltage close to 3.3V, thereby generating a logic '1' at the output data port 670.

Figure 9:
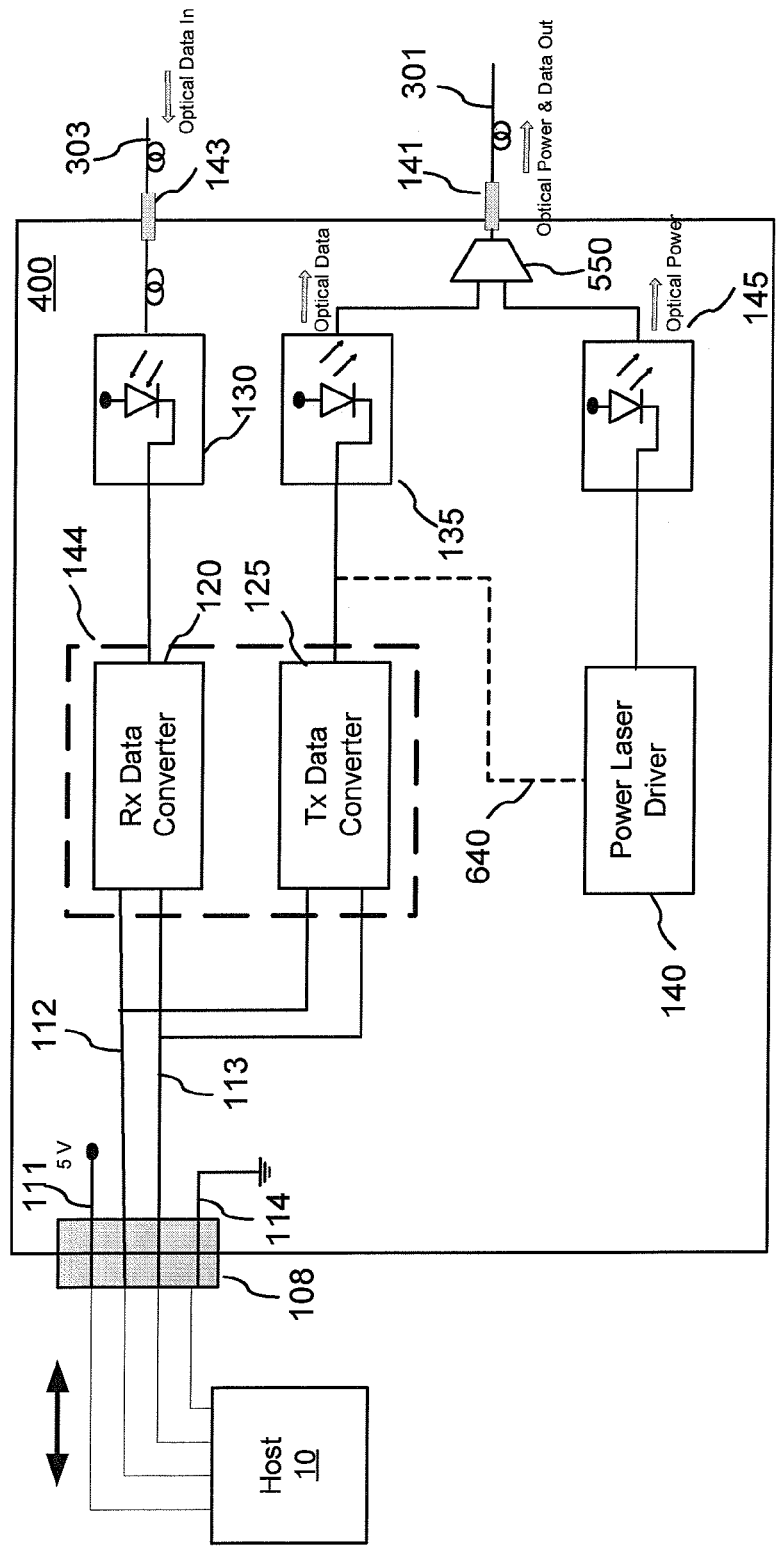
FIG. 9 is a diagram of a host interface module according to the second embodiment of the present invention.

With reference to FIG. 9, a HIM 400 is shown that can operate with the DIM 300 of FIG. 7 to form the ODL 5 of the present invention in the second embodiment thereof. The HIM 400 differs from the HIM 100 in that an optical multiplexer is used to combine the upstream optical data signal $P_{ud}$ generated by the MOS 135 and the optical power signal $P_p$ generated by the high-power laser 145 into a single optical beam, which is the coupled into the optical fiber 301. The optical multiplexer may be embodied as a wavelength multiplexer in embodiments wherein the optical power signal $P_p$ and the upstream optical signal $P_{ud}$ are separated in wavelength, for example, if the MOS 135 is a directly modulated VCSEL operating at a 1.3 μm, and the OPS 145 is a 980 nm pump laser diode. Alternatively, for example in embodiments wherein the OPS 145 and the MOS 135 operate at a substantially same wavelength, the multiplexer 550 can be a polarization multiplexer.

In another embodiment, both the MOS 135 and the optical multiplexer 550 can be eliminated, and the output signal from the Tx circuit 125 is used to modulate the drive current of the OPS 140, as schematically shown by dashed line 640. When the OSP 140 is embodied as a 980 nm pump laser diode emitting 1 W of power, such direct current modulation can be effective at modulation rates up to at least 1.5 Mbps or higher.

Figure 10:
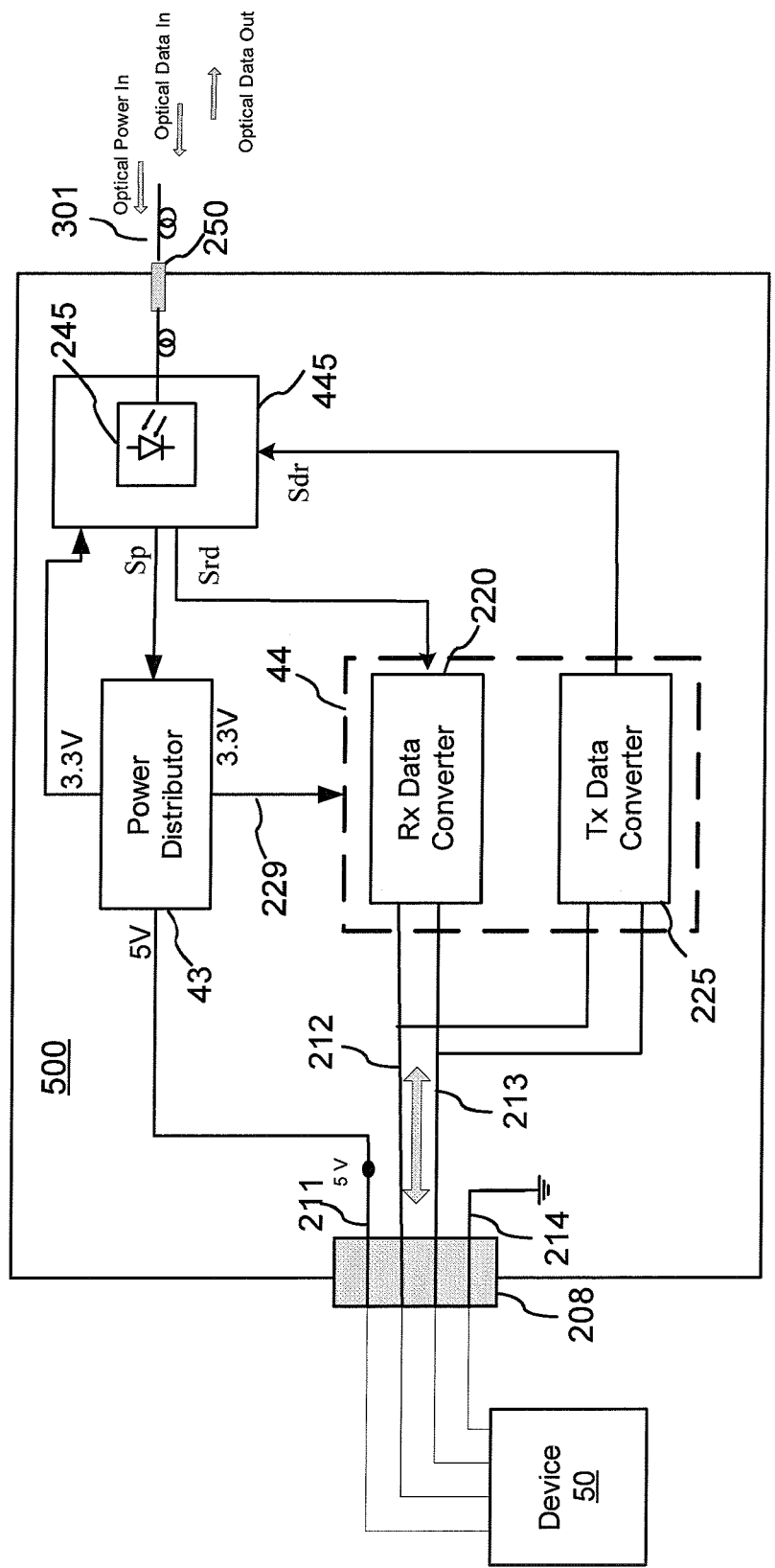
FIG. 10 is a diagram of a device interface module according to a third embodiment of the present invention with a transducer circuit utilizing a single PPC device for receiving and transmitting optical signals.

With reference to FIG. 10, a DIM 500 is shown according to a third embodiment of the present invention. In this embodiment, a transducer 445 of the DIM 500 utilizes the PPC 245 as a single opto-electronic converter, both to receive the upstream optical signal $P_{up}$ that carries optical power and data, and to generate the downstream optical data signal $P_{up}$. The optical line 30 connecting the DIM 500 with an downstream HIM consists in this embodiment of a single optical fiber 301 which supports the transmission of both the upstream and downstream optical signals; accordingly, the optical interface of the DIM 500 includes a single fiber-optic port/connector 250 to which the optical fiber 301 is coupled. The transducer 445, which serves herein as the transducer 42 of FIG. 1, includes the PPC 245 and may include additional circuitry such as a PPC bias control circuit and a signal-separation circuit, as described hereinbelow.

Figure 11:
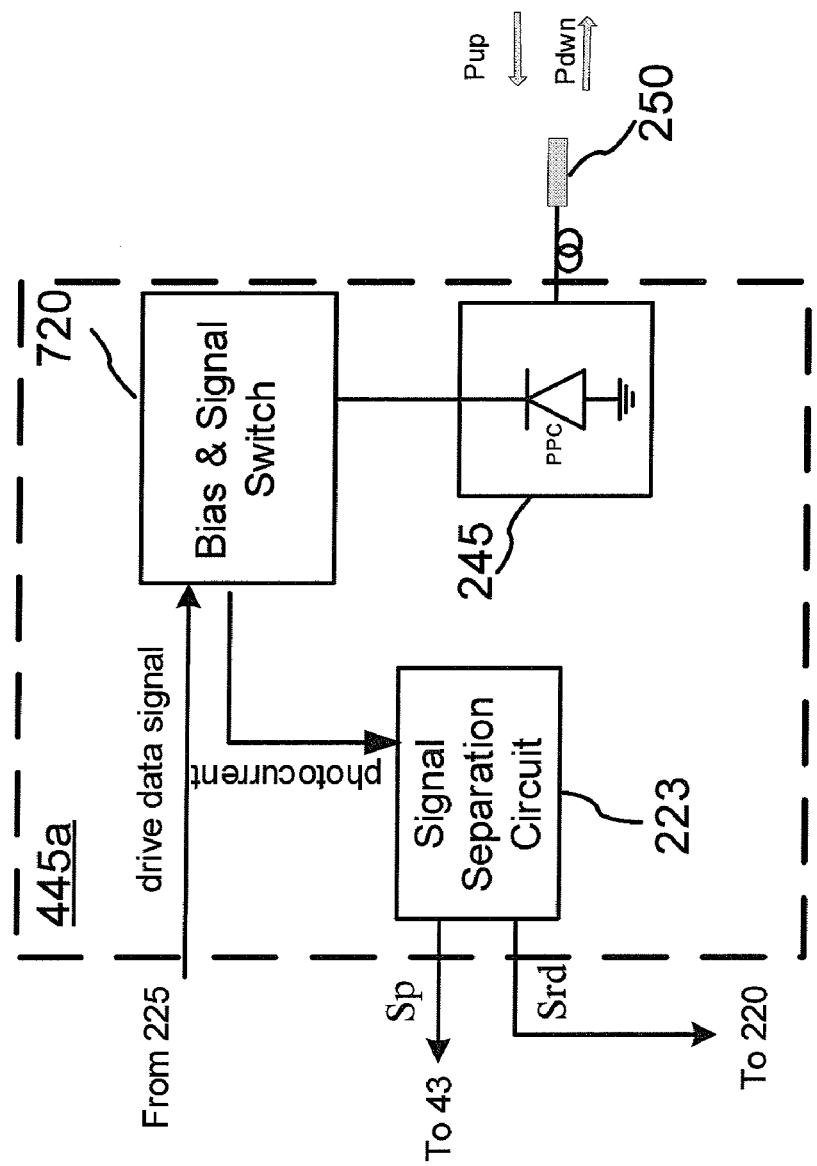
FIG. 11 is a diagram of one embodiment of the transducer circuit of the device interface module shown in FIG. 10.

With reference to FIG. 11, an embodiment 445a of the transducer 445 includes a bias and signal switching circuit (BSS) 720 for switching the PPC 245 from a photodetecting mode of operation to a light emitting mode of operation, and the SSC 223 for separating the power and data components of the received electrical signal $S_r$ when the PPC 245 operates in the photodetecting mode. The PPC 245 is preferably a monolithic multilayer semiconductor device that includes a plurality of P/N or PIN junctions that are connected in series, such as a multi-segment semiconductor power receiver described in U.S. Pat. No. 5,342,451 or, more preferably, as described in the co-pending patent applications entitled "Photovoltaic power converter" and "Multi-segment photovoltaic power converter with a center portion".

In the photodetecting mode of operation, which is hereinafter referred to as the PD mode, the PPC 245 is either zero biased or reverse biased, so that an electrical field in the P/N junctions separates photogenerated electrons and holes, resulting in the creation of a potential difference between the anode and cathode terminals of the PPC 245, or a positive photo-induced voltage at the anode terminal if the cathode terminal is grounded as in the shown embodiment. In the light-emitting mode of operation, which is hereinafter referred to as the LED mode, the PPC 245 is forward-biased, so that electrons and holes are injected in the P/N junction and recombine therein generating photons, and the PPC operates as an LED.

Figure 12:
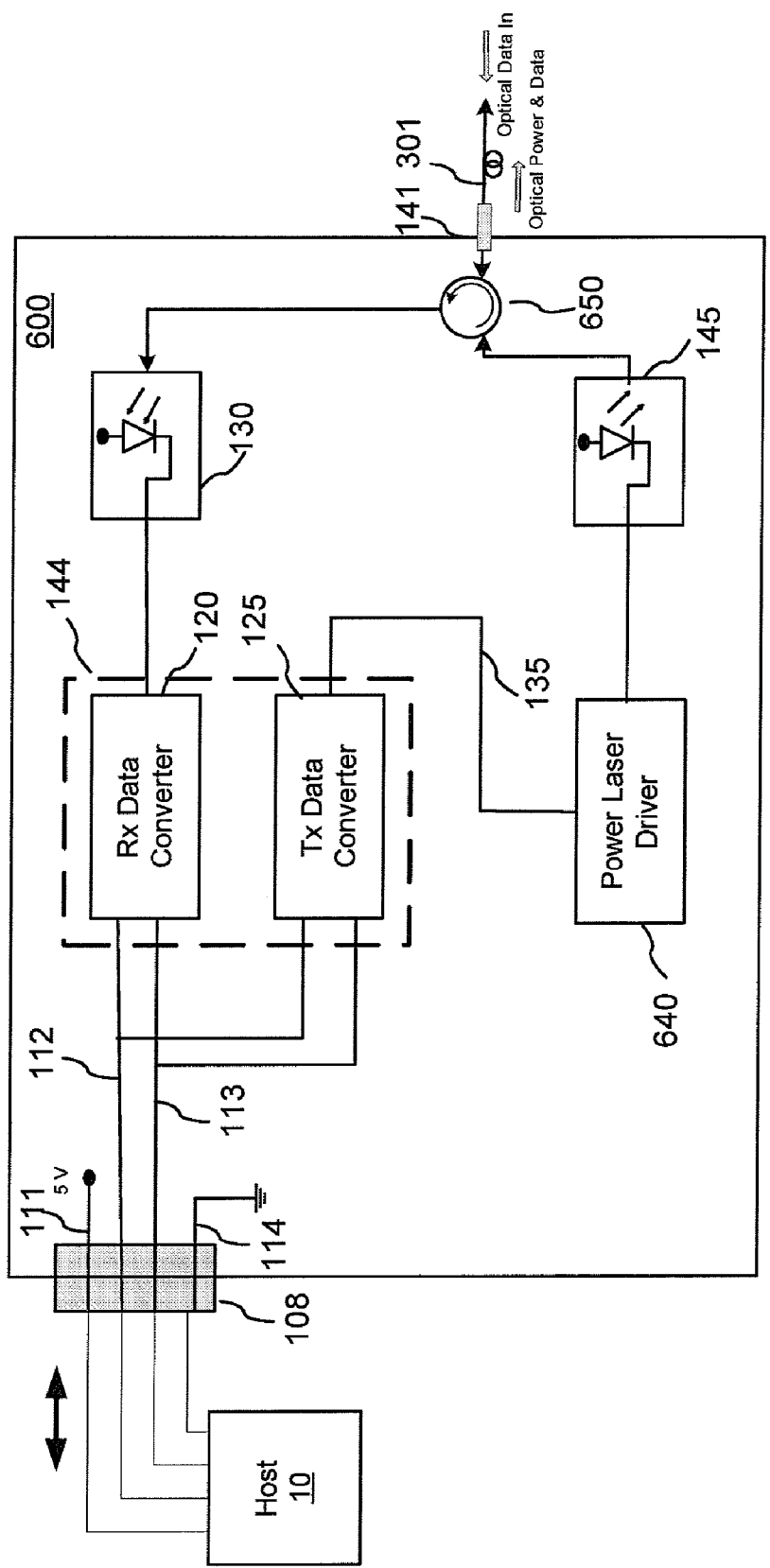
FIG. 12 is a diagram of a host interface module according to the third embodiment of the present invention.

Turning now to FIG. 12, a HIM 600 is illustrated that can operate with the DIM 500 to form the ODL 5 of the present invention in the third embodiment thereof. The HIM 600 differs from the HIM 400 mainly in two aspects: first, the OPS 145 is utilized to generate both the optical power signal $P_p$ and the upstream optical data signal $P_{up}$; for that purpose, the output of the Tx circuit 125 of the signal processor 144 is coupled to a driver circuit 640 of the OPS 145 for modulating the drive current of the OPS 145, so that the OPS 145 produces optical pulses carrying the upstream data signal generated by the host controller. The upstream optical signal $P_{up}$ carrying both the optical data and optical power is then provided to an optical circulator 650, which couples it into the optical fiber 301 for transmitting to the DIM 500. The same circulator 650 couples the downstream optical signal $P_{up}$ received through the fiber 301 from the DIM 500 into the PD 130 for converting it into an electrical data signal as described hereinabove with reference to the HIM 100.

The host controller 10 via the USB interface 108 of the HIM 600 may initiate communications with the external device 50 connected to the USB interface 208 of the DIM 500 by generating a PING packet. Upon receiving this packet, the HIM 600 generates the upstream optical signal $P_{up}$ carrying the PING packet in the form of optical pulses as described hereinabove with reference to HIM 100, which is transmitted to the DIM 500 over the optical fiber 301.

Referring back to FIG. 1, the upstream optical signal is received at the DIM 500 by the PPC 245, which by default operates in the PD mode wherein it is either zero-biased or reverse-biased. In this mode of operation, the PPC 245 first converts the upstream optical signal $P_{up}$ into the received electrical signal, which is coupled to the SSC 223. The SSC 223 obtains therefrom the electrical power signal $S_p$, with preferably a voltage component of at least 5V, which is then passed to the power distributor 43 shown in FIG. 10. The power distributor 43 provides 3.3V voltage to the signal extraction circuit 635 of the SSC 223, which powers up and extracts the received electrical data signal $S_{rd}$ from the received electrical signal $S_r$, as described hereinabove with reference to FIGS. 7 and 8. The received electrical data signal $S_{rd}$ is provided to the Rx circuit 220, which converts it back into the differential signal $S_{out}$ according to the USB signaling format, reproducing thereby the USB 'PING' data packet that was initially generated by the host controller.

Once the output differential signal $S_{out}$ carrying the PING packet is generated, the BSS 720 may be switched for forward biasing of the PPC 250 and for modulating the PPC 245 with the drive signal $S_{dr}$.

Upon receiving the output differential USB signal $S_{out}$ carrying the PING packet, the external device 50 generates a USB handshake packet in the form of a differential USB signal $S_{in}$=(D+, D−), and sends it over the D+ and D− signaling ports 212, 213 of the USB interface 208 back to the DIM 500, where it is received by the Rx circuit 220 of the signal processor 44 and converted into the single-ended electrical drive signal $S_{dr}$, which may be then provided to the PPC 245 of the transducer 445 in the form of a sequence of current pulses. The downstream optical signal $P_{up}$, which is generated by the forward-biased PPC 245 in response to the electrical drive signal $S_{dr}$, is coupled by the optical interface connector 250 into the optical fiber 301, which transmits it to the HIM 600 where it is received by the Rx circuit 102 of the signal processor 144.

Figure 13:
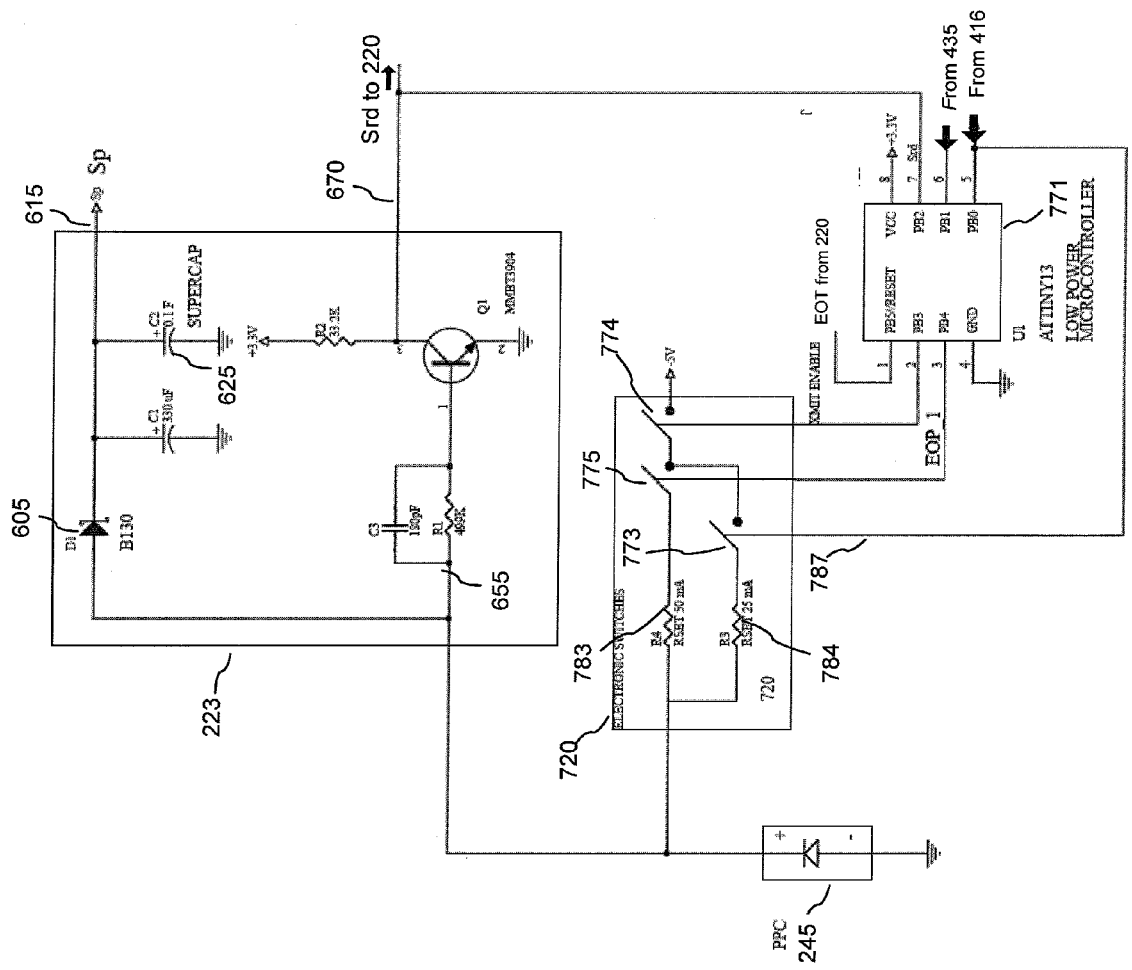
FIG. 13 is a circuit diagram of the transducer shown in FIG. 11.

FIG. 13 shows one possible implementation of the transducer circuit 445a of FIG. 11 in further detail. The anode terminal of the PPC 245 is connected to the SSC 223 which is described hereinabove, and to the BSS 720, which includes three switches 773, 774, and 775, with the switch 774 connected in series with a parallel combination of switches 773 and 775 between the PPC anode and a −5V feed provided by the power distributor 43. The switches 773 and 775 are referred to hereinafter as the EOP switch and the data switch, respectively, while the 774 switch is referred to as the bias switch, as it has to be closed to enable the LED mode of operation. The switches 773 and 774 are controlled by a controller 771, which is preferably embodied as a low-power microcontroller, such as the ATtiny13 microcontroller from Atmel Corp., but can also be embodied using other types of logic devices as would be known to those skilled in the art, examples of which include a microprocessor, an FPGA, and the like. A control interface of the data switch 773 is coupled to the Tx circuit 225 as illustrated by a control line 787, and receives a single-ended USB data signal D+ therefrom. Control interfaces of switches 775 and 774 are coupled to controller output ports PB4 and PB3, respectively.

Figure 14:
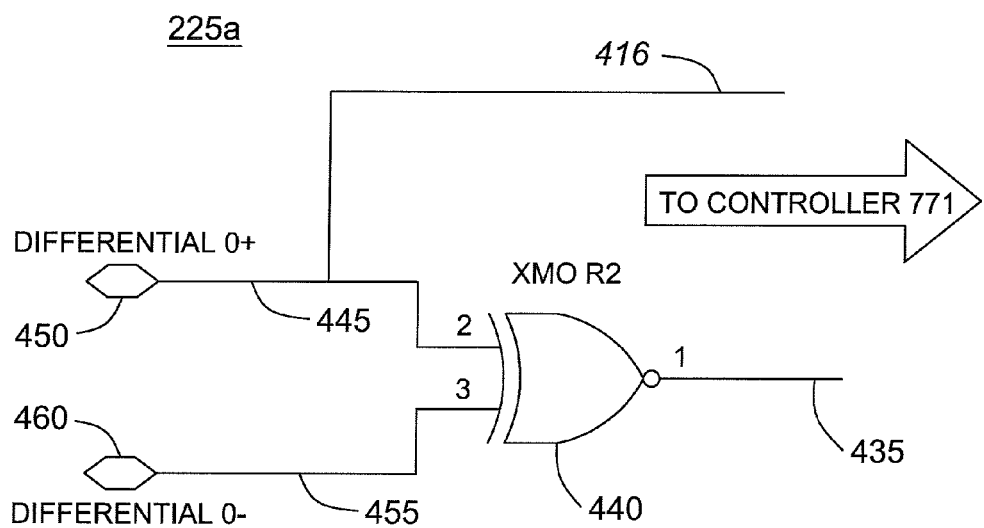
FIG. 14 is a circuit diagram of an alternative embodiment of the transmitter circuit for use with the transducer of FIG. 13.

FIG. 14 illustrates an embodiment 225a of the Tx circuit 225, which is suitable for operating with the transducer 445a of FIG. 13. The Tx circuit 225a is substantially an input portion of the Tx circuit shown in FIG. 4 that includes the XNOR gate 440, but without the corresponding transistors 470 and 420. Two output ports 416 and 435 of the Tx circuit 225a of FIG. 14 are connected to input ports PB0 and PB1 of the controller 771 for providing the D+ signal and the E=XNOR (D+,D−) signal, respectively. A third input port PB2 of the controller 771 is coupled to the data output port 670 of the SSC 223.

In the PD mode of operation, when the PPC 245 receives the upstream optical signal Pd, the switches 773-775 are all open, so that no current flows through the BSS 720, and the PPC 245 is substantially zero biased. The received signal Sr generated by the PPC 245 in the PD mode is provided to the SSC 223 for extracting the power and data signals Sp, $S_{rd}$ as described hereinabove. The controller 771 is programmed to monitor the received data signal $S_{rd}$ which is provided at the controller's PB2 port, and to control the bias switch 774 depending on said $S_{rd}$ signal. Once the upstream transmission is ended, the controller 771 closes the switch 774, for example by generating a control signal XMIT ENABLE at the port PB3. The end of the upstream transmission and of the PD mode of operation may be signified by the absence of the $S_{rd}$ signal for a pre-determined time interval, or by identifying a specific "End Of Transmission" (EOT) signal, such as a specific pulse or sequence of pulses, in the $S_{rd}$ signal.

The closing of the bias switch 774 enables the LED mode of operation. In this mode, the data switch 773 operates as a shutter and is controlled directly by the D+ signal from the Tx circuit 225a. For example, a logical "1" received through the control line 787 may cause the switch 773 to close, while receiving a logical "0" may cause the switch 773 to open. When both switches 773 and 774 are closed, the PPC 245 is forward-biased so that, for example, a 25 mA electrical current is drawn through the PPC 245 and the R3 resistor 784, causing the PPC 245 to emit light of a first intensity $I_1$, thereby optically transmitting a logical "1" downstream to an associated HIM. When the switch 773 is open, the PPC is disconnected from the −5V feed and no light is emitted by the PPC, which may correspond to transmitting a logical "0" downstream through the fiber 301.

Note that a negative polarity at the anode of the PPC 245 in the LED mode during the transmission of the logical '1' drives the transistor 655 and the Schottky diode 605 into cut-off, so that no signal is generated at the outputs of the SSC 223. The Schottky diode 605 also acts to switch off the stored supercap power from the PPC 245, so that the power stored in the supercap 625 is provided to the power distributor 43 which supplies all of the circuitry for up to 250 msec. Switching just one side of the PPC between GND and −5V, effectively isolates the PPC from both the SSC 223 and the Power Distributor 43 and reduces the number of transistor switches required.

The controller 771 is further programmed to monitor the E and optionally D+ signals from the Tx circuit 225a, and to generate therefrom a EOP_1 signal at the PB4 port that opens or closes the EOP switch 775. In one embodiment, the controller is programmed to generate a first EOP_1 signal, for example a logical "1", which closes the EOP switch 775 when E is a logical "1", and to generate a second EOP_1 signal, for example a logical "0", which opens the EOP switch 775 when E is a logical "1". Accordingly, during the transmission of the EOP signal the data switch 773 is open while the EOP switch 775 is closed, so that, for example a 50 mA electrical current is drawn through the PPC 245 and the R4 resistor 783, causing the PPC 245 to emit light of a second intensity $I_2$ that is substantially, preferably by at least 50%, larger than the first intensity $I_1$, thereby optically transmitting the EOP symbol downstream to the associated HIM.

Figure 15:
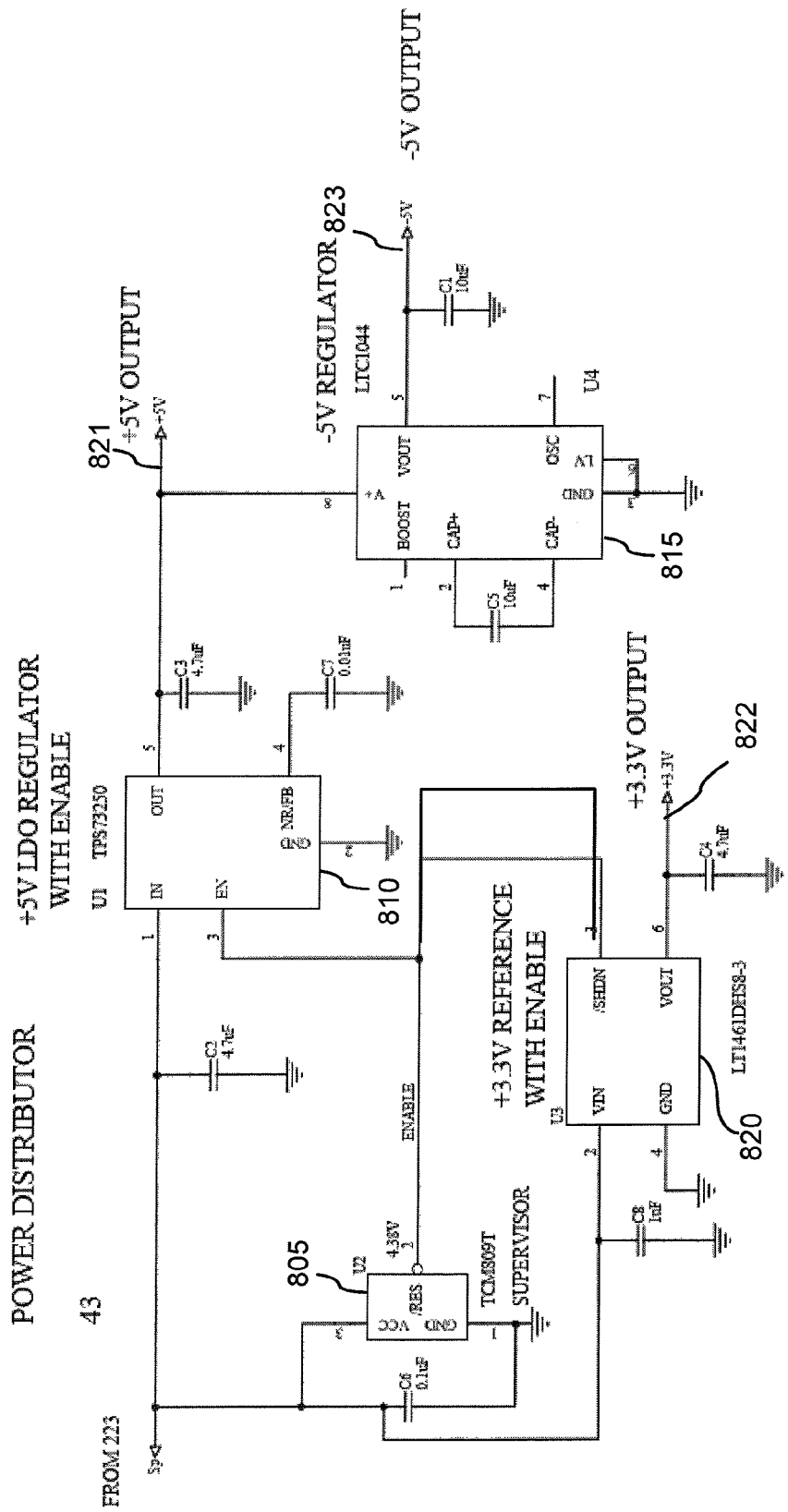
FIG. 15 is a circuit diagram of the power distributor.

FIG. 15 shows an exemplary embodiment of the power distributor circuit 43. As shown, the circuit converts the electrical power signal Sp received at an input port 801 in the form of a dc voltage, into the regulated voltages +5V, +3.3V, and −5V at output ports 821, 822 and 823 respectively, which are used by the DIM 500. The electrical power signal $S_p$ drives two low dropout (LDO) regulators that are directly connected to the input port 801, a +5V LDO 810 which generates +5V at the output port 821, and a 3.3V reference LDO regulator 820, which generates +3.3V at the output port 822. Both regulators 810 and 820 are controlled by an "ENABLE" signal so as to keep the regulators 810, 820 turned off until the Sp voltage rises to a high enough value, for example to 4.3V, in order to assure the PPC stability during a power up phase when the capacitor 620 and the optional super-capacitor 625 of the power extraction circuit 630 are charging up from zero volts. A supervisor/threshold detector 805 keeps the voltage regulator 810 turned off with a zero volt signal to its "ENABLE" pin until the voltage component of the power signal Sp rises to a few volts in order to start the PPC before applying the load which will assure a stable and successful start up. When the PPC voltage rises above approximately 4.5V, the supervisor/threshold detector 805 switches the enable signal to "high" after a delay of about 140 milliseconds. The LDO regulators 810 and 820 are then enabled and the outputs are turned on to +5V and +3.3V respectively. The steady-state PPC voltage may be approximately between 5.5V and 6.2V.

Capacitors C2, C3, C4, C6, C7, and C8 are provided for stability and noise reduction of the circuitry of the power distributor 43. An optional −5V regulator 815 is connected to the +5V output of the LDO regulator 810, from which it receives the regulated 5V signal. This regulator, together with it associated capacitors C1 and C5, converts the +5V signal to −5V signal for use with embodiments of a transducer 445 operating in the LED mode as described herein with reference to FIGS. 13, 19.

In the embodiment of FIGS. 11 and 13, the PPC 245 does not supply power to the DIM 500 in the LED mode of operation. In one embodiment, the electrical power required for operation of the DIM in the LED mode is supplied by the super-capacitor 625, which by way of example may have a value of 0.1 Farad. The duration of the Tx mode of the transducer 445a may be limited to a time interval T1, for example 250 milliseconds, during which this capacitor is only partially drained of charge so that the voltage at the output of the power distributor 43 does not drop by more than 0.5V.

Once the maximum duration of the LED mode is reached, the transducer 445a is switched back to the PD mode of operation by the controller 771, for example by opening the bias switch 774, wherein it receives optical power from the downstream HIM. The switching to the PD mode can also be caused by the controller 771 when it identifies an EOT signal in the data signals received from the Tx 225a.

In one embodiment, the data signals D+ and E received from the Tx circuit 225a are first buffered by the controller 771, and then applied to the data and EOP switches 773, 775 during the LED mode of operation. This data buffering enables the DIM 400 to simultaneously receive the electrical downstream data from the device 50, and the optical upstream signal from the HIM 500.

Advantageously, the DIM 500 of the third embodiment of the present invention utilizes a single PPC device to perform three functions—detection of upstream optical data signals, generation of downstream optical data signals, and conversion of optical power into electrical power for powering the DIM 500 and the device 50. In the embodiment described hereinabove with reference to FIG. 11, the PPC 245 as a whole is switched between the Rx mode and the Tx mode, so that when the PPC 245 is in the Tx mode, incoming light is not converted to electricity.

Figure 16:
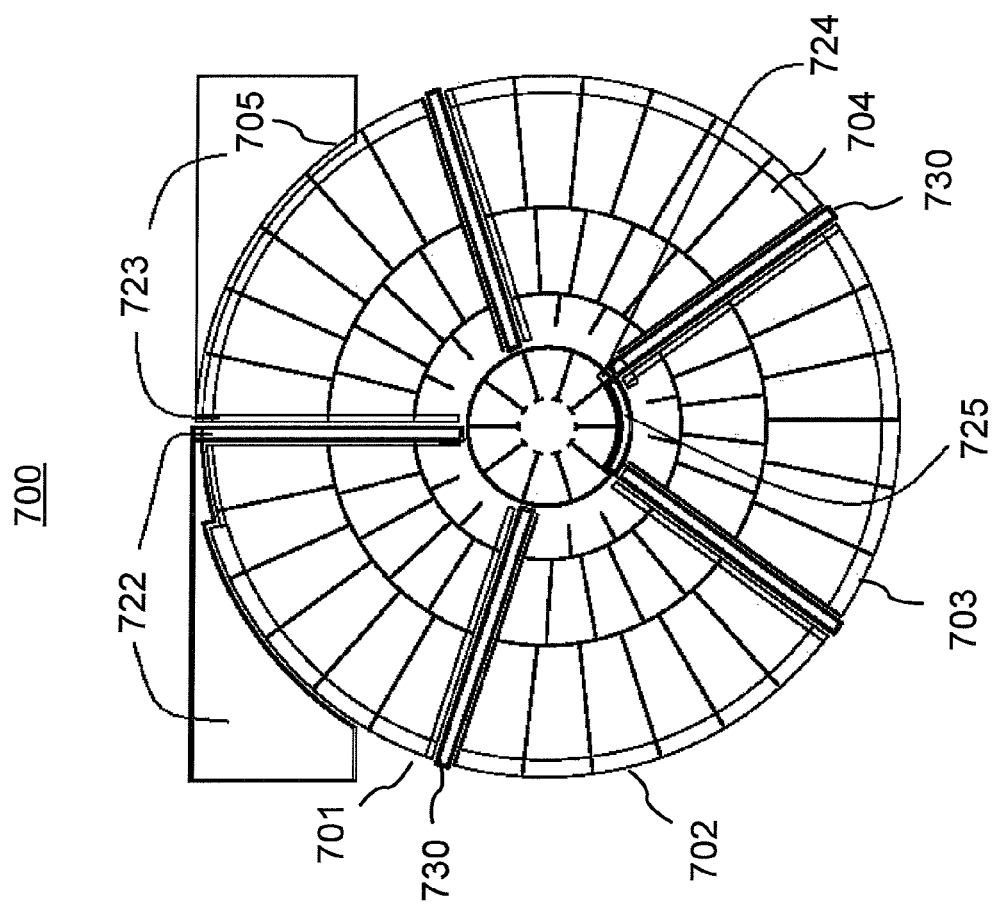
FIG. 16 is atop view of a multi-segment PPC.

The co-pending US patent application entitled "Multi-segment photovoltaic power converter with a center portion" describes a PPC which has independently biased portions, or sections, so that, for example, one section of the PPC can operate as a light transmitter, while the rest of the PPC operates as a light detector and/or photovoltaic power converter. An exemplary embodiment 700 of such PPC is illustrated in FIG. 16, which shows a face of the device that receives light. The PPC 700 includes five segments 701-705 shaped as ring fragments that are positioned outside of a central circular segment 722; the five ring segments 701-705 will be referred to herein collectively as the ring section.

The segments 701-705 and 724 are separated by trenches 730, and each of them includes a semiconductor heterostructure that includes a p-n junction, with p and n layers parallel to the plane of the figure. The central portion may include two p-n junctions, one on top of the other. In one embodiment, the five p-n junctions of the ring segments 701-705 are electrically connected in series by metallic interconnecting bridges coupling a p layer of one ring segment to an n layer of an adjacent ring segment, so that when the device receives light, voltages generated across each of the p-n junctions in the ring section are summed to provide a higher PPC voltage $V_{PPC}$ between contact pads 722 and 723. P and n layers of a p-n junction of the central section 724 are separately electrically coupled to another two contact pads, which are not shown.

Advantageously, a portion of the PPC 700, i.e. the p-n junction of the central segment 724, or one of the pn junctions if the central segment 724 has two or more pn junctions, can be biased independently from the serially connected pn junctions of the ring segments 701-705; for example, the central portion 725 of the PPC 700 can be forward-biased to emit light, while the ring segments 701-705 can be either zero-biased or reversed biased to detect light and convert it into an electrical signal. Note that other segment combinations are possible, wherein the p-n junctions of the PPC segments are connected so as to form two electrically isolated device portions or sections that can be biased independently.

Figure 17:
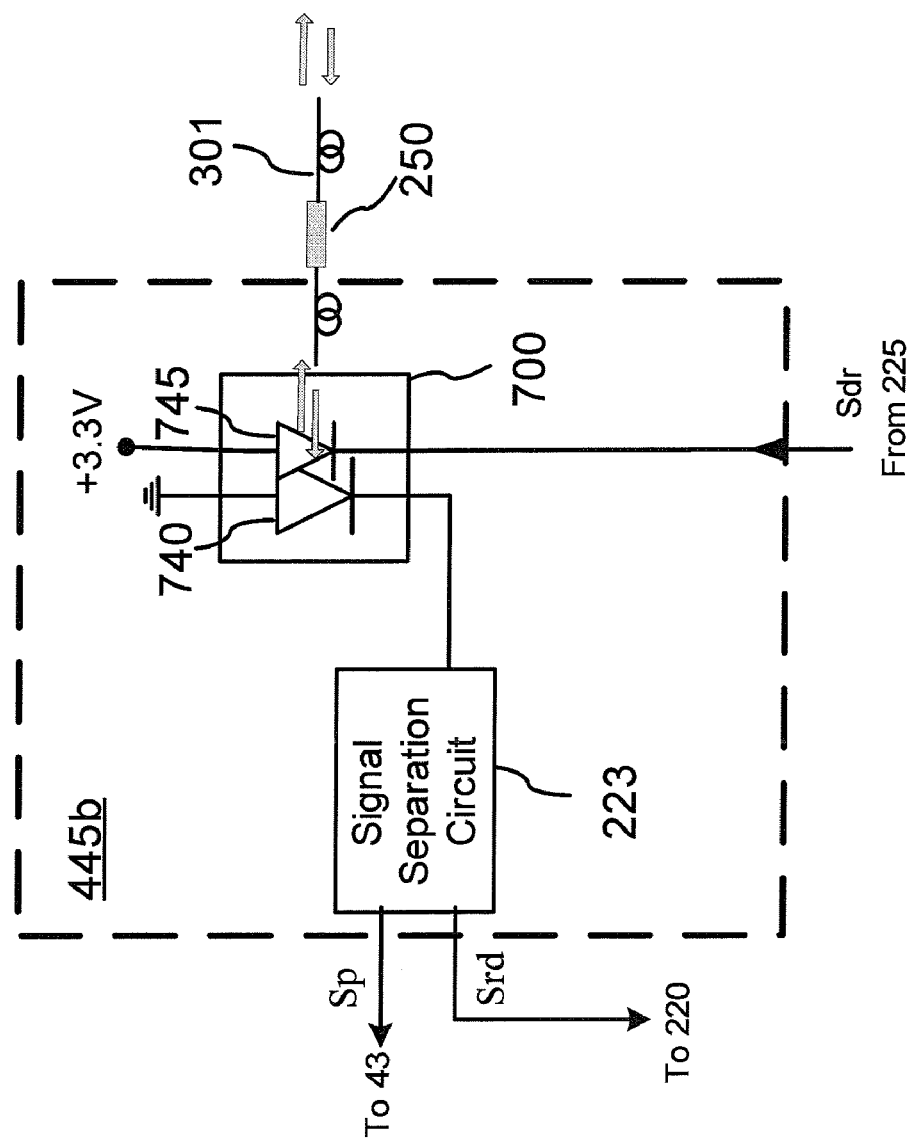
FIG. 17 is a diagram of an embodiment of the transducer circuit shown in FIG. 11 utilizing the multi-segment PPC of FIG. 16.

Referring now to FIG. 17, an embodiment 445b of the transducer 445 utilizes the PPC 700 of FIG. 16 as the PPC 245. The electrically isolated device portions of the PPC 700 are schematically shown with diode symbols labeled with reference numerals 745 and 740, respectively. By way of example, the first device portion 740, which will also be referred to herein as the receive portion, corresponds to the serially connected ring segments 701-705, while the second portion 745, which will also be referred to herein as the transmit portion, corresponds to the central segment 724 of the PPC 700. The transmit portion 745 of the PPC 700 is directly independently of the receive portion 740 thereof by the current drive signal $S_{dr}$, which is generated by the Tx circuit 225 embodied for example as the Tx circuit shown in FIG. 4.

The DIM 500 operates in this embodiments in substantially the same way as the DIM 300 that is described hereinabove with reference to FIG. 7, except that both the power and data components of the upstream optical signal $P_{up}$ are now received through a single optical fiber 301. When the upstream optical signal $P_{up}$ impinges upon the PPC 700, the receive portion 740, which in this embodiment is substantially zero biased, converts it into the received electrical signal $S_r$. The received electrical signal $S_r$ is then passed onto the SSC 223, which produces therefrom the electrical power signal $S_p$ and the received data signal $S_{rd}$, as described hereinabove.

In the downstream path, one or more USB packets generated by the device 50 in response to the host-generated signals, for example the handshake packet, are again converted by the Tx circuit 225 into the drive signal $S_{dr}$, which drives the second, i.e. transmit portion 745. The transmit portion 745 is forward-biased, so that it emits the downstream optical signal $P_{up}$ in the form of a sequence of optical pulses, wherein each optical pulse corresponds to either a 'high' state of one of the D+ or D− USB signals received from the device 50, or to the "double-zero" EOP symbol indicating the end of a packet, in which case the respective optical pulse has a larger magnitude as described hereinabove.

Advantageously, the transducer 445b is capable of generating electrical power both when it receives the downstream optical data and when it generates the upstream optical data, provided that the optical power signal $P_p$ is continuously generated by the OPS 145 of the downstream HIM 600, and does not require switching between forward and reverse biasing of either the first or second portions 740, 745 of the PPC 700.

Figure 18:
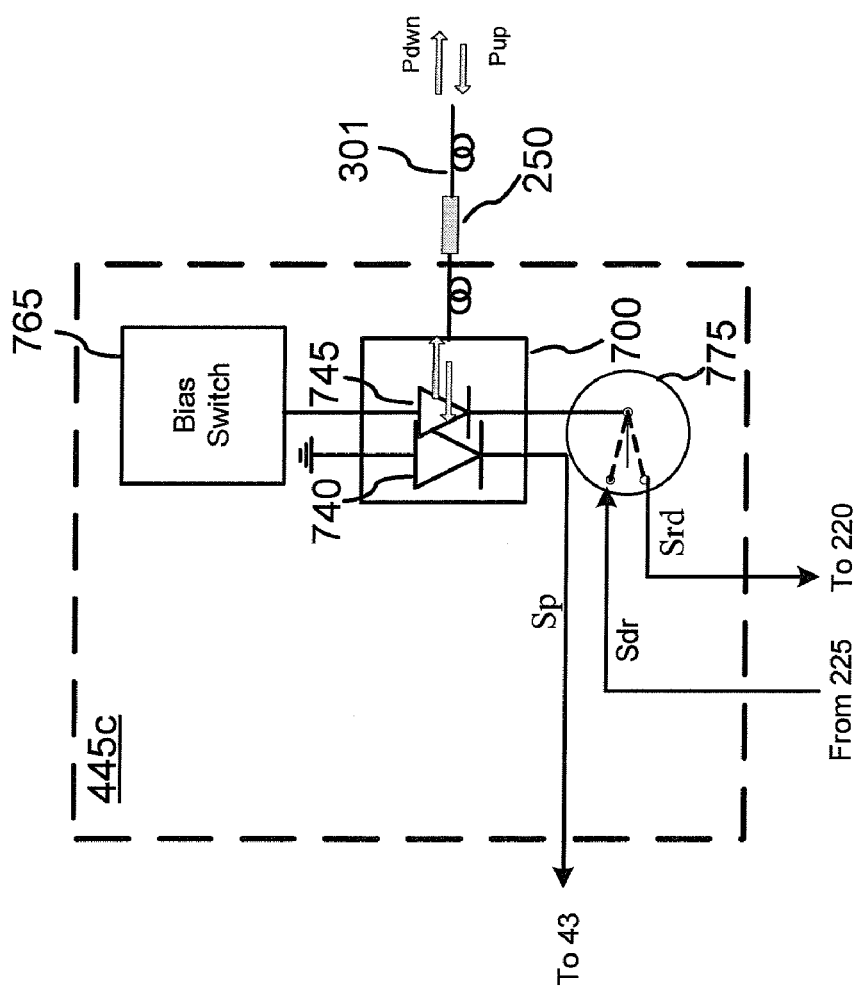
FIG. 18 is a block diagram of another embodiment of the transducer circuit utilizing the multi-segment PPC of FIG. 16.

With reference to FIG. 18, another embodiment 445c of the transducer 445 is shown that also utilizes the multi-segment PPC 700, but in a different way that combines features of the 445a and 445b transducers. In this embodiment, the first portion 740 of the PPC 700 provides electrical power signal $S_p$, while the independently biased second portion 745 of the PPC 700 is switched between the PD mode of operation wherein it is zero- or reverse-biased and receives the upstream optical data signal, and the LED mode of operation wherein it is forward biased and transmits the downstream optical data signal. Advantageously, the first portion of the PPC 700 is zero or reversed biased during both the PD and LED modes of operation, and therefore uninterruptedly provides electrical power to the DIM 500 and the device 50 as long as the optical power signal is provided by the downstream HIM. A bias switch 765 and an signal switch 775 are utilized to switch the second portion 745 of the PPC 700 from a PD mode of operation when it is reversed or zero biased to an LED mode of operation when it is forward biased.

Figure 19:
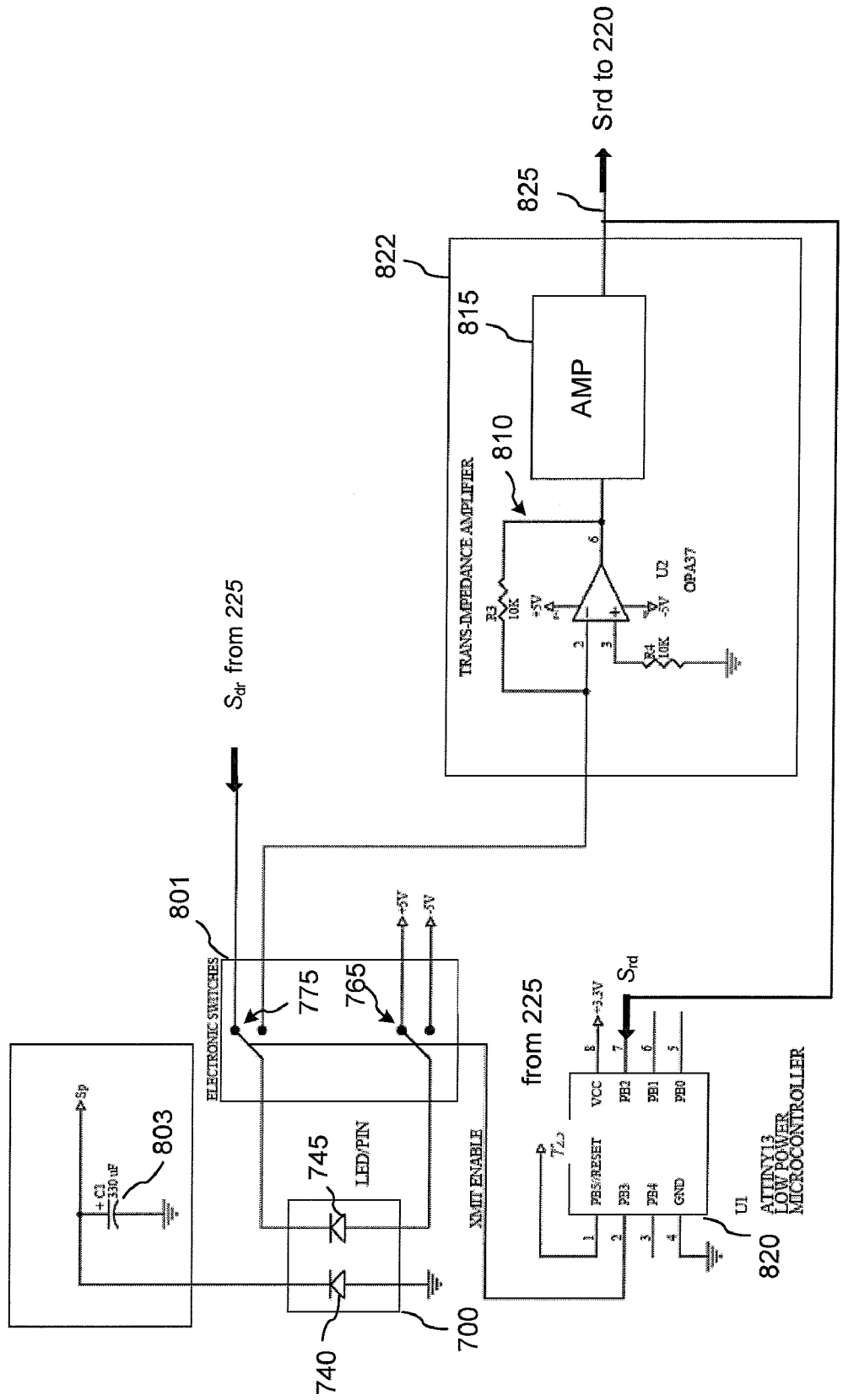
FIG. 19 is a circuit diagram of the transducer circuit of FIG. 18.

Turning now to FIG. 19, one possible implementation of the circuit of FIG. 18 is shown wherein the bias switch 765 and the signal switch 775 are embodied as a double pole, double throw (DPDT) switch 801 controlled by a controller 820, which can be embodied as described hereinabove with reference to the controller 771. The DPDT switch 801 is shown in FIG. 19 in a first state corresponding to the LED mode of operation, wherein the LED/PD portion 745 of the PPC 700 is forward biased and is driven by the $S_{dr}$ current signal from the Tx circuit 225, which can be again embodied as the circuit 120 of FIG. 4. The controller 820 may monitor the D+ and E signals from the Tx circuit 225 to detect the end of the downstream transmission, and ones the transmission end is detected, generates a control signal XMIT ENABLE at its PB3 pin for switching the DPDT switch 801 to a second state corresponding to the PD mode of operation.

In this second state, the LED/PD portion 745 of the PPC 700 is reversed biased and converts received upstream optical data signal $P_{ud}$ into photocurrent, which is converted into a voltage signal by a trans-impedance amplifier (TIA) circuit 822, which includes a TIA 810 and an optional post-amplifier unit 815. The TIA circuit 822 generates at it output port 825 the received electrical data signal $S_{rd}$ in the form of a sequence of voltage pulses, which are then passed to the Rx circuit 220 for converting the $S_{rd}$ signal into the differential USB format as described hereinabove. The $S_{rd}$ signal is also provided to a PB2 pin of the controller 820, which monitors it to detect an end of the upstream transmission, which can be signified for example by the absence of the $S_{rd}$ signal, or said signal being below a pre-defined threshold, for a predefined time interval. Once the end of upstream transmission is detected, the controller 820 may switch the DPDT switch 801 to the first state corresponding to the LED mode of operation, when the DIM 500 transmits the downstream optical signal $P_{up}$.

During both the LED and PD modes of operation, the first portion 740 of the PPC 700 may convert received light into the electrical power signal $S_p$ which is then provided to the power distributor 43 for powering the external device 50 and the DIM 500 circuitry. An optional capacitor 803 at the anode of the first portion 740 of the PPC 700 provides stability to the power signal $S_p$ generated by the PPC portion 740.

Figure 20:
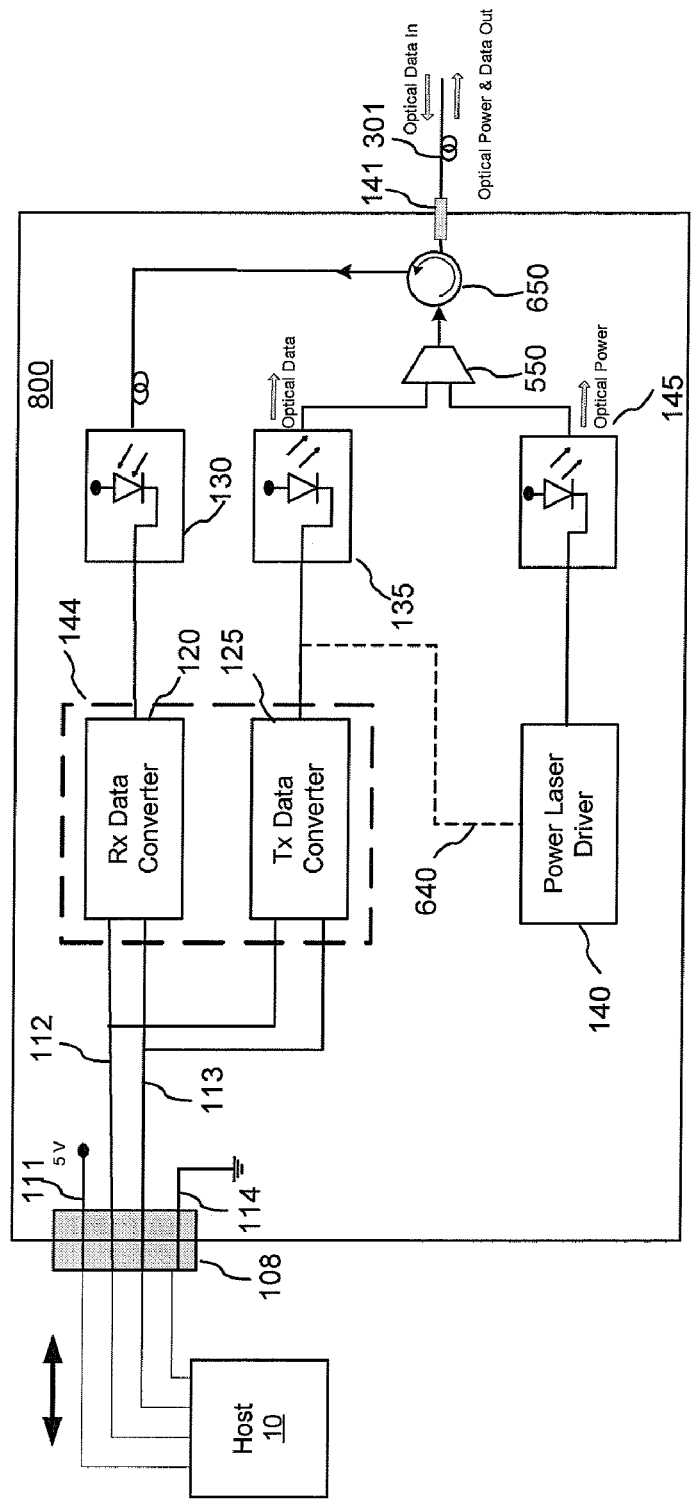
FIG. 20 is a diagram of an alternative embodiment of the USB host interface module for use with the USB device interface module shown in FIG. 10.

With reference to FIG. 20, a HIM 800 is shown according to another embodiment of the present invention, which can operate with the DIM 500. In this embodiment, the upstream optical data signal $P_{ud}$ is generated by the MOS 135, and is then combined with the optical power signal $P_p$ by the multiplexer 550 to form the upstream optical signal $P_{up}$, which is then coupled into the optical fiber 301 by the circulator 650, which also couples the downstream optical data signal Pup into the PD 130. Advantageously, this embodiment enables to utilize a higher upstream data transmission rate by using a MOS 135 that has a higher modulation bandwidth than the high-power OPS 145. This embodiment also enables to use different wavelengths for the upstream optical data and power signals, which in turn enables to increase a power conversion efficiency at the upstream DIM by using a multi-segment PPC, for example as the PPC 700 in the transducer 445c of FIG. 18, wherein the second portion has two p-n junctions.

By way of example, the OPS 145 emits the optical power signal $P_p$ at a first wavelength $\lambda_p$, which may be 980 nm, while the MOS 135 emits the upstream optical data signal $P_{up}$ at a second wavelength $\lambda$d, which may be 1.3 µm. Referring now back to FIG. 16, each of the ring segments 701-705 and the central segment 724 of the PPC 700 includes a first p-n junction formed in a first semiconductor material that has a bandgap suitable for absorbing light at the first wavelength $\lambda_p$, while the central segment 724 has also a second p-n junction formed in a second semiconductor material that has a bandgap suitable for absorbing light at the second wavelength $\lambda_d$. The first p-n junctions of the ring segments 701-705 and optionally the central segment 724 are connected in series to form the first portion 740 of the PPC 700, which is independently electrically addressable and is electrically coupled to the power distributor 43 as shown in FIG. 18. The second p-n junction of the central segment 724 of the PPC 700 forms the second portion 745 of the PPC 700 as shown in FIG. 18, which is also independently electrically addressable and is electrically coupled to the Rx circuit 225 and may also be coupled to the Tx circuit 220 through the signal switch 775 as shown in FIGS. 18, 19. Advantageously, this enables to maximize the optical power conversion efficiency of the PPC 700 by utilizing all its segments to convert the optical power signal $P_p$ into the electrical power signal $S_p$, with the optical power conversion efficiency of the PPC defined herein as the ratio $S_p/P_p$.

The present invention has been described hereinbefore with reference to exemplary embodiments thereof and in particular with reference to devices and modules that utilize a USB protocol and USB interfaces. However, those skilled in the art would appreciate that aspects of the invention are also applicable to optically powered optical data link which utilize alternative communications interfaces and alternative data communications protocols associated therewith, a non-exclusive list of which includes the FireWire, RS232, I2C, SPI, DVI and Ethernet. Adopting the DIM and HIM of the present invention to these standards may require alternative embodiments of the signal processor circuits and may also require the use of additional photodetectors and LEDs at the respective device an host interface modules. Also, some embodiments may include a DIM incorporating a hub such as a USB hub and having more than one electrical interface for operating more than one external device at a time.

Note that the particular embodiments of the system and method of the present invention described hereinabove may utilize portions of other embodiments and are by way of example only, and alternative embodiments of many elements and steps can be employed in particular applications of the invention as would be evident for those skilled in the art.

Of course numerous other embodiments may be envisioned without departing from the spirit and scope of the invention.

We claim:

1. A device interface module for operating an external device, comprising:
    an optical interface for receiving an upstream optical signal from an optical fiber line and for transmitting a downstream optical signal through the optical fiber line;
    an electrical interface for connecting to the external device, comprising
        a data port for receiving an input electrical data signal from the external device according to a pre-determined data communications protocol and for providing an output electrical data signal to the device, and
        an output power port for providing electrical power to the remote device;
    a transducer optically coupled to the optical interface for converting the upstream optical signal into a received electrical data signal and electrical power, and for generating the downstream optical data signal;
    a signal processor comprising:
        a receiver circuit operatively connected between the transducer and the electrical data port for producing the output electrical data signal from the received electrical data signal according to the pre-determined data communications protocol, and
        a transmitter circuit operatively connected between the electrical data port and the transducer, for producing an electrical drive signal from the input electrical data signal for driving the transducer therewith to generate the downstream optical data signal; and,
    a power distribution circuit for distributing the electrical power obtained from the upstream optical signal for powering the external device, the signal processor and the transducer,
    wherein the transducer comprises a multi-segment photovoltaic power converter (MSPPC), and a bias circuit for forward biasing at least a segment of the MSPPC for generating the downstream optical signal.

2. A device interface module of claim 1, wherein the electrical interface is one of a universal serial bus (USB) interface, a firewire interface, an RS232 interface, an I2C interface, an SPI interface, a DVI interface and an Ethernet interface.

3. A device interface module of claim 1, wherein, the transducer comprises a signal separation circuit for separating power and data components of the detected electrical signal.

4. A device interface module of claim 1, further comprising a switching circuit for switching the at least a segment of the MSPPC between a photodetecting mode of operation and a light emitting mode of operation.

5. A device interface module of claim 4, further comprising a controller for controlling the switching circuit, wherein the controller is operatively connected for monitoring at least one of the received electrical data signal and the output electrical data signal so as to switch the at least a segment of the MSPPC from the photodetecting mode of operation to the light emitting mode of operation upon detecting an end of the upstream transmission.

6. A device interface module of claim 5, wherein the controller is operatively connected for monitoring at least one of the electrical drive signal and the input electrical data signal so as to switch the at least a segment of the MSPPC from the light emitting mode of operation to the photodetecting mode of operation upon detecting an end of the downstream transmission.

7. A device interface module for operating an external device, comprising:
an optical interface for receiving an upstream optical signal from an optical fiber line and for transmitting a downstream optical signal through the optical fiber line;
an electrical interface for connecting to the external device, comprising
a data port for receiving an input electrical data signal from the external device according to a pre-determined data communications protocol and for providing an output electrical data signal to the device, and
an output power port for providing electrical power to the remote device;
a transducer optically coupled to the optical interface for converting the upstream optical signal into a received electrical data signal and electrical power, and for generating the downstream optical data signal;
a signal processor comprising:
a receiver circuit operatively connected between the transducer and the electrical data port for producing the output electrical data signal from the received electrical data signal according to the pre-determined data communications protocol, and
a transmitter circuit operatively connected between the electrical data port and the transducer, for producing an electrical drive signal from the input electrical data signal for driving the transducer therewith to generate the downstream optical data signal; and,
a power distribution circuit for distributing the electrical power obtained from the upstream optical signal for powering the external device, the signal processor and the transducer,
wherein the transducer comprises a multi-segment photovoltaic power converter (MSPPC) comprising a first device section for converting the optical power signal into the electrical power, and a second device section for converting the upstream optical signal into the received electrical data signal.

8. A device interface module of claim 1, wherein the MSPPC comprises a first device section for converting the upstream optical signal into the received electrical signal, and a second device section for generating the downstream optical data signal.

9. A device interface module of claim 7, wherein the optical interface comprises a fiber-optic connector for receiving the upstream optical data and power signals from a same optical fiber.

10. A device interface module of claim 1, wherein the optical interface comprises a fiber-optic connector, and wherein the MSPPC is optically coupled to said fiber-optic connector for receiving the upstream optical signal and for transmitting the downstream optical signal through a same optical fiber of the optical fiber line.

11. An optical data link comprising the device interface module of claim 7, further comprising:
a host interface module, and
the optical fiber line optically connecting the host interface module to the device interface module;
wherein the host interface module comprises
an electrical interface electrically coupled to a host USB controller, and
an optical transceiver optically coupled to the optical fiber line, the optical transceiver configured for
converting an upstream electrical data signal provided from the host USB controller into the upstream optical signal so that each differential pulse of the first polarity in the upstream electrical signal is converted into a light pulse of a first intensity, and each double-zero EOP signal is converted into a light pulse of a second intensity that is greater than the first intensity, and
converting the downstream optical data signals received from the device interface module into upstream electrical data signals for providing to the host controller.

12. An optical data link of claim 11, wherein the optical transceiver comprises:
an optical power source for generating an optical power signal,
a modulated optical source for generating a upstream optical data signal,
a photodetector for converting the upstream optical signal into an electrical signal and,
a coupling means for coupling the optical power signal and the upstream optical data signal into the optical fiber line for producing the upstream optical signal, and for coupling the downstream optical signal into the photodetector.

13. An optical data link of claim 11, wherein the optical fiber line comprises three optical fibers, and wherein the coupling means comprises fiber-optic connectors for optically coupling the optical power source, the modulated optical source and the photodetector to a different one of three optical fibers.

14. An optical data link of claim 12, wherein the coupling means comprises an optical coupler coupled to a fiber-optic connector for coupling the optical power source and the modulated optical source into a single strand of optical fiber.

15. An optical data link of claim 14, wherein the coupling means further includes an optical circulator positioned optically between the optical coupler and the fiber-optic connector for optically coupling the photodetector to the single strand of optical fiber.

16. An optical data link of claim 11, wherein the optical transceiver comprises an optical power source for generating the upstream optical signal, and electrical circuitry for modulating the optical power source with and electrical pulse signal produced from the upstream electrical data signal.

17. A device interface module of claim 7, wherein the electrical interface is a universal serial bus (USB) interface, and the input and output electrical data signals are USE-compliant differential voltage pulse signals generated according to a USB protocol.

18. A device interface module of claim 17, wherein the electrical drive signal and the received electrical data signal are single-ended electrical signals, and wherein the receiver circuit is configured for converting the received electrical data signal into a USE-compliant differential voltage signal, and the transmitter circuit is configured for converting the USE-compliant input electrical signal into the single-ended electrical drive signal.

19. A device interface module for operating an external device, comprising:
an optical interface for receiving an upstream optical signal from an optical fiber line and for transmitting a downstream optical signal through the optical fiber line;

an electrical interface for connecting to the external device, comprising
  a data port for receiving an input electrical data signal from the external device according to a pre-determined data communications protocol and for providing an output electrical data signal to the device, and
  an output power port for providing electrical power to the remote device;
a transducer optically coupled to the optical interface for converting the upstream optical signal into a received electrical data signal and electrical power, and for generating the downstream optical data signal;
a signal processor comprising:
  a receiver circuit operatively connected between the transducer and the electrical data port for producing the output electrical data signal from the received electrical data signal according to the pre-determined data communications protocol, and
  a transmitter circuit operatively connected between the electrical data port and the transducer, for producing an electrical drive signal from the input electrical data signal for driving the transducer therewith to generate the downstream optical data signal; and,
a power distribution circuit for distributing the electrical power obtained from the upstream optical signal for powering the external device, the signal processor and the transducer,
wherein the transducer comprises:
  a photovoltaic power converter (PPC) switchably coupled to the receiver circuit and the transmitter circuit for converting the upstream optical signal into the received electrical signal and for converting the electrical drive signal into the downstream optical signal, and
  two electrical switches connected in parallel in a bias circuit of the PPC for producing the electrical drive signal driving the PPC;
wherein the device interface module further comprises a controller for independently controlling the two electrical switches for producing electrical pulses of two different magnitudes for driving the PPC therewith in dependence on the input electrical data signal.

* * * * *